(12) United States Patent
Sasaki et al.

(10) Patent No.: US 7,184,246 B2
(45) Date of Patent: Feb. 27, 2007

(54) THIN-FILM MAGNETIC HEAD HAVING HEATER MEMBER AND BUMP FOR ELECTRICAL CONNECTION OF HEATER MEMBER

(75) Inventors: Tetsuro Sasaki, Chuo-ku (JP); Nobuya Oyama, Chuo-ku (JP); Soji Koide, Chuo-ku (JP); Norikazu Ota, Chuo-ku (JP)

(73) Assignee: TDK Corporation, Tokyo (JP)

( * ) Notice: Subject to any disclaimer, the term of this patent is extended or adjusted under 35 U.S.C. 154(b) by 460 days.

(21) Appl. No.: 10/784,795

(22) Filed: Feb. 24, 2004

(65) Prior Publication Data

US 2004/0179299 A1 Sep. 16, 2004

(30) Foreign Application Priority Data

Mar. 12, 2003 (JP) ............................. 2003-067228

(51) Int. Cl.
*G11B 5/56* (2006.01)
(52) U.S. Cl. .................................... 360/294.7
(58) Field of Classification Search ............. 360/294.7
See application file for complete search history.

(56) References Cited

U.S. PATENT DOCUMENTS 6,928,722 B2 * 8/2005 Yanagisawa ............. 29/603.07
6,963,464 B2 * 11/2005 Xu et al. ........................ 360/75
6,992,865 B2 * 1/2006 Thurn et al. ............. 360/294.7

FOREIGN PATENT DOCUMENTS

| JP | A 5-20635 | 1/1993 |
| JP | A 09-074094 | 3/1997 |
| JP | A 10-041307 | 2/1998 |

* cited by examiner

*Primary Examiner*—A. J. Heinz
(74) *Attorney, Agent, or Firm*—Oliff & Berridge, PLC

(57) ABSTRACT

A heater member is formed in structure including a heater layer with a low electrical resistivity and a cap layer with a higher electrical resistivity, an electrically conductive electrode film is formed thereon, and electrically conductive bumps are formed thereon by plating. Unnecessary part of the electrode film is removed using the bumps as a mask. The heater member generates heat to thermally expand a thin-film magnetic head, whereby the distance is reduced between a recording medium and, a magnetoresistive device and/or an electromagnetic conversion device. During removal of the electrode film part of the cap layer with the higher electrical resistivity in the heater member is removed together with the electrode film, which reduces the variation in the total resistance of the heater member.

7 Claims, 17 Drawing Sheets

Fig.12

| | MATERIAL OF FIRST LAYER | RESISTIVITY OF MATERIAL OF FIRST LAYER (μΩ·cm) | MATERIAL OF SECOND LAYER | RESISTIVITY OF MATERIAL OF SECOND LAYER (μΩ·cm) | RATIO OF RESISTIVITY OF MATERIAL OF SECOND LAYER TO RESISTIVITY OF MATERIAL OF FIRST LAYER (—) | THICKNESS OF FIRST LAYER (nm) | THICKNESS OF SECOND LAYER (nm) | SHEET RESISTANCE OF HEATER (Ω) | SHEET RESISTANCE VARIATION (%) |
|---|---|---|---|---|---|---|---|---|---|
| COMPARATIVE EXAMPLE1 | NiFe | 23 | — | — | — | 150 | — | 1.533 | 7.2 |
| | | | | | | 140 | | 1.643 | |
| EXAMPLE1 | NiFe | 23 | NiFeNb (Nb5wt%) | 45 | 2.0 | 150 | 20 | 1.436 | 3.3 |
| | | | | | | | 10 | 1.483 | |
| EXAMPLE2 | NiFe | 23 | NiFeNb (Nb10wt%) | 70 | 3.0 | 150 | 20 | 1.469 | 2.1 |
| | | | | | | | 10 | 1.500 | |
| EXAMPLE3 | NiFe | 23 | NiFeNb (Nb14wt%) | 90 | 3.9 | 150 | 20 | 1.485 | 1.6 |
| | | | | | | | 10 | 1.509 | |
| EXAMPLE4 | NiFe | 23 | NiFeNb (Nb20wt%) | 120 | 5.2 | 150 | 20 | 1.495 | 1.3 |
| | | | | | | | 10 | 1.514 | |
| EXAMPLE5 | NiFe | 23 | Ti | 180 | 7.8 | 150 | 20 | 1.508 | 0.8 |
| | | | | | | | 10 | 1.520 | |
| EXAMPLE6 | NiFe | 23 | Ta | 180 | 7.8 | 150 | 20 | 1.508 | 0.8 |
| | | | | | | | 10 | 1.520 | |

Fig.13

| | MATERIAL OF FIRST LAYER | RESISTIVITY OF MATERIAL OF FIRST LAYER (μΩ·cm) | MATERIAL OF SECOND LAYER | RESISTIVITY OF MATERIAL OF SECOND LAYER (μΩ·cm) | RATIO OF RESISTIVITY OF MATERIAL OF SECOND LAYER TO RESISTIVITY OF MATERIAL OF FIRST LAYER (—) | THICKNESS OF FIRST LAYER (nm) | THICKNESS OF SECOND LAYER (nm) | SHEET RESISTANCE OF HEATER (Ω) | SHEET RESISTANCE VARIATION (%) |
|---|---|---|---|---|---|---|---|---|---|
| COMPARATIVE EXAMPLE 2 | Cu | 3 | — | — | — | 120 / 110 | — | 0.250 / 0.273 | 9.2 |
| EXAMPLE 7 | Cu | 3 | AuCu (Cu5at%) | 7.5 | 2.5 | 120 | 20 / 10 | 0.231 / 0.240 | 3.9 |
| EXAMPLE 8 | Cu | 3 | AuNi (Ni5at%) | 10.5 | 3.5 | 120 | 20 / 10 | 0.238 / 0.244 | 2.5 |
| EXAMPLE 9 | Cu | 3 | AuNi (Ni7at%) | 12 | 4.0 | 120 | 20 / 10 | 0.240 / 0.2449 | 2.0 |
| EXAMPLE 10 | Cu | 3 | AuNi (Ni10at%) | 15 | 5.0 | 120 | 20 / 10 | 0.242 / 0.246 | 1.7 |
| EXAMPLE 11 | Cu | 3 | NiFe | 23 | 7.7 | 120 | 20 / 10 | 0.245 / 0.247 | 0.8 |
| EXAMPLE 12 | Cu | 3 | CoFe | 20 | 6.7 | 120 | 20 / 10 | 0.244 / 0.247 | 1.2 |

Fig.14

| | MATERIAL OF FIRST LAYER | RESISTIVITY OF MATERIAL OF FIRST LAYER (μΩ·cm) | MATERIAL OF SECOND LAYER | RESISTIVITY OF MATERIAL OF SECOND LAYER (μΩ·cm) | RATIO OF RESISTIVITY OF MATERIAL OF SECOND LAYER TO RESISTIVITY OF MATERIAL OF FIRST LAYER (—) | THICKNESS OF FIRST LAYER (nm) | THICKNESS OF SECOND LAYER (nm) | SHEET RESISTANCE OF HEATER (Ω) | SHEET RESISTANCE VARIATION (%) |
|---|---|---|---|---|---|---|---|---|---|
| COMPARATIVE EXAMPLE3 | Au | 3.5 | — | — | — | 120 / 110 | — | 0.292 / 0.318 | 8.9 |
| EXAMPLE13 | Au | 3.5 | AuCu (Cu5at%) | 7.5 | 2.1 | 120 | 20 / 10 | 0.266 / 0.278 | 4.5 |
| EXAMPLE14 | Au | 3.5 | AuCu (Ni10at%) | 10 | 2.9 | 120 | 20 / 10 | 0.276 / 0.283 | 2.5 |
| EXAMPLE15 | Au | 3.5 | AuCu (Ni20at%) | 14 | 4.0 | 120 | 20 / 10 | 0.281 / 0.286 | 1.8 |
| EXAMPLE16 | Au | 3.5 | AuNi (Ni15at%) | 20 | 5.7 | 120 | 20 / 10 | 0.283 / 0.287 | 1.4 |
| EXAMPLE17 | Au | 3.5 | Ti | 180 | 51.0 | 120 | 20 / 10 | 0.2907 / 0.2912 | 0.2 |
| EXAMPLE18 | Au | 3.5 | Ta | 180 | 51.0 | 120 | 20 / 10 | 0.2907 / 0.2912 | 0.2 |

Fig.15

| | MATERIAL OF FIRST LAYER | RESISTIVITY OF MATERIAL OF FIRST LAYER (μΩ·cm) | MATERIAL OF SECOND LAYER | RESISTIVITY OF MATERIAL OF SECOND LAYER (μΩ·cm) | RATIO OF RESISTIVITY OF MATERIAL OF SECOND LAYER TO RESISTIVITY OF MATERIAL OF FIRST LAYER (—) | THICKNESS OF FIRST LAYER (nm) | THICKNESS OF SECOND LAYER (nm) | SHEET RESISTANCE OF HEATER (Ω) | SHEET RESISTANCE VARIATION (%) |
|---|---|---|---|---|---|---|---|---|---|
| COMPARATIVE EXAMPLE4 | Mo | 16 | — | — | — | 150 | — | 1.067 | 7.1 |
| | | | | | | 140 | | 1.143 | |
| EXAMPLE19 | Mo | 16 | NiFeNb (Nb2wt%) | 32 | 2.0 | 150 | 20 | 1.000 | 3.2 |
| | | | | | | | 10 | 1.032 | |
| EXAMPLE20 | Mo | 16 | NiFeNb (Nb5wt%) | 45 | 2.8 | 150 | 20 | 1.018 | 2.4 |
| | | | | | | | 10 | 1.042 | |
| EXAMPLE21 | Mo | 16 | NiFeNb (Nb7wt%) | 60 | 3.8 | 150 | 20 | 1.035 | 1.5 |
| | | | | | | | 10 | 1.051 | |
| EXAMPLE22 | Mo | 16 | NiFeNb (Nb12wt%) | 80 | 5.0 | 150 | 20 | 1.039 | 1.3 |
| | | | | | | | 10 | 1.053 | |
| EXAMPLE23 | Mo | 16 | Ti | 180 | 11.3 | 150 | 20 | 1.054 | 0.6 |
| | | | | | | | 10 | 1.060 | |
| EXAMPLE24 | Mo | 16 | Ta | 180 | 11.3 | 150 | 20 | 1.054 | 0.6 |
| | | | | | | | 10 | 1.060 | |

Fig.16

| | MATERIAL OF FIRST LAYER | RESISTIVITY OF MATERIAL OF FIRST LAYER ($\mu\Omega\cdot cm$) | MATERIAL OF SECOND LAYER | RESISTIVITY OF MATERIAL OF SECOND LAYER ($\mu\Omega\cdot cm$) | RATIO OF RESISTIVITY OF MATERIAL OF SECOND LAYER TO RESISTIVITY OF MATERIAL OF FIRST LAYER (—) | THICKNESS OF FIRST LAYER (nm) | THICKNESS OF SECOND LAYER (nm) | SHEET RESISTANCE OF HEATER ($\Omega$) | SHEET RESISTANCE VARIATION (%) |
|---|---|---|---|---|---|---|---|---|---|
| COMPARATIVE EXAMPLE5 | Rh | 17.5 | — | — | — | 150 | — | 1.167 | 7.1 |
| | | | | | | 140 | | 1.250 | |
| EXAMPLE25 | Rh | 17.5 | NiFeNb (Nb2wt%) | 32 | 1.8 | 150 | 20 | 1.087 | 3.6 |
| | | | | | | | 10 | 1.126 | |
| EXAMPLE26 | Rh | 17.5 | NiFeNb (Nb5wt%) | 45 | 2.6 | 150 | 20 | 1.109 | 2.5 |
| | | | | | | | 10 | 1.137 | |
| EXAMPLE27 | Rh | 17.5 | NiFeNb (Nb10wt%) | 70 | 4.0 | 150 | 20 | 1.129 | 1.7 |
| | | | | | | | 10 | 1.148 | |
| EXAMPLE28 | Rh | 17.5 | NiFeNb (Nb15wt%) | 95 | 5.4 | 150 | 20 | 1.139 | 1.2 |
| | | | | | | | 10 | 1.153 | |
| EXAMPLE29 | Rh | 17.5 | Ti | 180 | 10.3 | 150 | 20 | 1.152 | 0.6 |
| | | | | | | | 10 | 1.159 | |
| EXAMPLE30 | Rh | 17.5 | Ta | 180 | 10.3 | 150 | 20 | 1.152 | 0.6 |
| | | | | | | | 10 | 1.159 | |

Fig.17

| | MATERIAL OF FIRST LAYER | RESISTIVITY OF MATERIAL OF FIRST LAYER (μΩ·cm) | MATERIAL OF SECOND LAYER | RESISTIVITY OF MATERIAL OF SECOND LAYER (μΩ·cm) | RATIO OF RESISTIVITY OF MATERIAL OF SECOND LAYER TO RESISTIVITY OF MATERIAL OF FIRST LAYER (—) | THICKNESS OF FIRST LAYER (nm) | THICKNESS OF SECOND LAYER (nm) | SHEET RESISTANCE OF HEATER (Ω) | SHEET RESISTANCE VARIATION (%) |
|---|---|---|---|---|---|---|---|---|---|
| COMPARATIVE EXAMPLE6 | CoFe | 20 | — | — | — | 130 | — | 1.538 | 8.4 |
| | | | | | | 120 | | 1.667 | |
| EXAMPLE31 | CoFe | 20 | NiFeNb (Nb5wt%) | 45 | 2.3 | 130 | 20 | 1.440 | 3.3 |
| | | | | | | | 10 | 1.488 | |
| EXAMPLE32 | CoFe | 20 | NiFeNb (Nb10wt%) | 70 | 3.5 | 130 | 20 | 1.474 | 2.1 |
| | | | | | | | 10 | 1.505 | |
| EXAMPLE33 | CoFe | 20 | NiFeNb (Nb12wt%) | 80 | 4.0 | 130 | 20 | 1.481 | 1.9 |
| | | | | | | | 10 | 1.509 | |
| EXAMPLE34 | CoFe | 20 | NiFeNb (Nb15wt%) | 95 | 4.8 | 130 | 20 | 1.490 | 1.6 |
| | | | | | | | 10 | 1.514 | |
| EXAMPLE35 | CoFe | 20 | Ti | 180 | 9.0 | 130 | 20 | 1.513 | 0.8 |
| | | | | | | | 10 | 1.525 | |
| EXAMPLE36 | CoFe | 20 | Ta | 180 | 9.0 | 130 | 20 | 1.513 | 0.8 |
| | | | | | | | 10 | 1.525 | |

THIN-FILM MAGNETIC HEAD HAVING HEATER MEMBER AND BUMP FOR ELECTRICAL CONNECTION OF HEATER MEMBER

BACKGROUND OF THE INVENTION

1. Field of the Invention

The present invention relates to a method of producing a thin-film magnetic head, a thin-film magnetic head, a head gimbal assembly, and a hard disk drive.

2. Related Background Art

A thin-film magnetic head with a writing electromagnetic conversion device and/or a reading magnetoresistive device is configured to float or fly over a hard disk as a recording medium during recording into or reading from a hard disk drive (e.g., Japanese Patent Application Laid-Open No. 5-20635). Specifically, the thin-film magnetic head is mounted on a gimbal, and the gimbal is attached to a distal end of a flexible suspension arm, thereby constructing a head gimbal assembly (HGA). Then an airflow made with rotation of the hard disk flows under the thin-film magnetic head to bend the suspension arm, whereupon the head flies.

With increase in density of the hard disk, the air gap or head fly height between the thin-film magnetic head and the hard disk has been decreasing as 20 nm, 15 nm, and 10 nm to the limit.

SUMMARY OF THE INVENTION

For achieving higher density, it is necessary to further decrease the distance between the recording medium and the electromagnetic conversion device and/or the magnetoresistive device of the thin-film magnetic head from those having been achieved heretofore.

The present invention has been accomplished in order to solve the above problem and an object thereof is to provide a method of producing a thin-film magnetic head, a thin-film magnetic head, a head gimbal assembly, and a hard disk drive capable of achieving a smaller spacing between the recording medium and the electromagnetic conversion device and/or the magnetoresistive device of the thin-film magnetic head.

The Inventors have conducted elaborate research and found that the distance between the magnetoresistive device/electromagnetic conversion device and the recording medium opposed to these magnetoresistive device and electromagnetic conversion device could be reduced by providing a heater member adapted to generate heat when energized, in the thin-film magnetic head, and thermally expanding the thin-film magnetic head by the heat generated by the heater member.

In production of the thin-film magnetic head with such a heater member, it is necessary to form bumps for electrically connecting the heater member to external power input terminals, in addition to the heater member. In this process, an electrode film is formed on the heater member, the bumps are formed on portions of this electrode film by plating, and thereafter the rest of the electrode film is removed using the bumps as a mask; this results in also removing the heater member immediately below the electrode film and, in turn, causing the variation in the resistance of the heater member in certain cases. However, the Inventors found a solution of constructing the heater member of a heater layer having a small electrical resistivity and a cap layer provided on the heater layer and having an electrical resistivity larger than that of the heater layer, with the effect of reducing the variation in the resistance of the heater layer due to the removal of the electrode film, and thus accomplished the present invention.

A method of production of a thin-film magnetic head according to the present invention is a method of producing a thin-film magnetic head, comprising: a heater member forming step of forming a heater member having a heater layer with a predetermined electrical resistivity and a cap layer with an electrical resistivity higher than that of the heater layer, provided on the heater layer; an electrode film forming step of forming an electrically conductive electrode film on the heater member; a bump forming step of forming an electrically conductive bump on part of the electrode film by plating using the electrode film as an electrode; and an electrode film removing step of removing the rest of the electrode film, using the bump as a mask.

By the production method of the thin-film magnetic head according to the present invention, the heater member is formed in the thin-film magnetic head and during use of the thin-film head the heater member is energized to generate heat so as to thermally expand the thin-film magnetic head, whereby the distance is reduced between the recording medium and the magnetoresistive device/electromagnetic conversion device of the thin-film magnetic head.

The heater member has the heater layer with the low electrical resistivity, and the cap layer with the electrical resistivity higher than that of the heater layer, formed on the heater layer, and in the step of removing the electrode film formed on the heater member, part of the cap layer on the heater layer is also removed together with the electrode film. A contribution of the cap layer with the higher electrical resistivity is smaller than a contribution of the heater layer with the low electrical resistivity, to the total resistance of the heater member having the parallel circuit composed of the heater layer and the cap layer in this structure. For this reason, even if variation occurs in the thickness of the cap layer among thin-film magnetic heads due to the removal of the cap layer during the removal of the electrode film, the variation in the sheet resistance of the entire heater member is smaller than that among the magnetic heads made without the cap layer and experiencing the variation in the thickness of the heater layer due to the removal of the heater layer. Therefore, it is feasible to suitably control the heat generated in the heater member in each thin-film magnetic head.

Preferably, the heater member forming step is to form the heater member so that the heater layer has an exposed portion exposed to the outside, the electrode film forming step is to form the electrode film over the cap layer and the exposed portion of the heater layer, and the bump forming step is to form the bump on a portion of the electrode film in contact with the exposed portion of the heater layer.

In this method, the bump is electrically connected to the heater layer, without an intermediate of the cap layer having the electrical resistivity higher than that of the heater layer, and thus an electric current is allowed to flow suitably to the heater.

Preferably, the electrical resistivity of the cap layer is four or more times the electrical resistivity of the heater layer.

This enables us to control the variation in the sheet resistance of the heater to 2% or less.

Examples of the material for the heater layer include Cu, Au, Ni, Co, Ta, W, Mo, Rh, and alloys of these.

Examples of the material for the cap layer include Ta, Ti, Pt, Ru, Rh, Hf, Cr, Ni, Co, W, Mo, Rh, and alloys of these.

Preferably, the heater member forming step is to form at least one of the heater layer and the cap layer by sputtering.

This permits us to suitably form, particularly, a relatively thin heater.

A thin-film magnetic head according to the present invention is a thin-film magnetic head comprising: a heater layer with a predetermined electrical resistivity forming a current-carrying path of a predetermined shape; an electrically conductive electrode film member located so as to face a portion of one principal surface of the heater layer and electrically connected to the heater layer; a cap layer with an electrical resistivity higher than that of the heater layer, provided in fit to the shape of the current-carrying path on the other portion of said one principal surface of the heater layer; and an electrically conductive bump formed on the electrode film member by plating.

In the thin-film magnetic head of the present invention, the heater member including the heater layer and the cap layer is energized during use of the thin-film head to generate heat so as to thermally expand the thin-film magnetic head, whereby the distance is reduced between the recording medium and the magnetoresistive device/electromagnetic conversion device of the thin-film magnetic head. A parallel circuit is composed of the heater layer with the low electrical resistivity and the cap layer with the higher electrical resistivity, and the contribution of the cap layer with the higher electrical resistivity is smaller than that of the heater layer with the low electrical resistivity, to the total resistance of the heater member. For this reason, even if variation occurs in the thickness of the cap layer among thin-film magnetic heads due to the removal of the cap layer by a certain thickness in the production step of forming the electrode film member by removing the electrode film formed on the heater member, using the bump as a mask, the variation in the resistance of the heater member is smaller than that among the magnetic heads made without the cap layer and experiencing the variation in the thickness of the heater layer.

In the above thin-film magnetic head, preferably, the electrode film member is laid on said one portion of the heater layer.

In this configuration, the bump is electrically connected to the heater layer, without an intermediate such as the cap layer with the electrical resistivity higher than that of the heater layer, or the like, and thus an electric current is allowed to flow suitably to the heater layer.

Preferably, the electrical resistivity of the cap layer is four or more times the electrical resistivity of the heater layer.

This enables us to control the variation in the sheet resistance of the heater to 2% or less.

Examples of the above heater layer include Cu, Au, Ni, Co, Ta, W, Mo, Rh, and alloys of these, and examples of the above cap layer include Ta, Ti, Pt, Ru, Rh, Hf, Cr, Ni, Co, W, Mo, Rh, and alloys of these.

A head gimbal assembly according to the present invention is a head gimbal assembly comprising a base, a thin-film magnetic head formed on the base, and a gimbal adapted to fix the base, wherein the thin-film magnetic head comprises a heater layer with a predetermined electrical resistivity forming a current-carrying path of a predetermined shape; an electrically conductive electrode film member located so as to face a portion of one principal surface of the heater layer and electrically connected to the heater layer; a cap layer with an electrical resistivity higher than that of the heater layer, provided in fit to the shape of the current-carrying path on the other portion of said one principal surface of the heater layer; and an electrically conductive bump formed on the electrode film member by plating.

A hard disk drive according to the present invention is a hard disk drive comprising a base, a thin-film magnetic head formed on the base, and a recording medium opposed to the thin-film magnetic head, wherein the thin-film magnetic head comprises a heater layer with a predetermined electrical resistivity forming a current-carrying path of a predetermined shape; an electrically conductive electrode film member located so as to face a portion of one principal surface of the heater layer and electrically connected to the heater layer; a cap layer with an electrical resistivity higher than that of the heater layer, provided in fit to the shape of the current-carrying path on the other portion of said one principal surface of the heater layer; and an electrically conductive bump formed on the electrode film member by plating.

The head gimbal assembly and the hard disk drive as described above comprise the aforementioned thin-film magnetic head, whereby the distance is reduced similarly between the recording medium and the magnetoresistive device/electromagnetic conversion device of the thin-film magnetic head and the variation is reduced in the resistance of the heater.

BRIEF DESCRIPTION OF THE DRAWINGS

FIG. 12 is a table for Comparative Example 1 and Examples 1–6.

FIG. 13 is a table for Comparative Example 2 and Examples 7–12.

FIG. 14 is a table for Comparative Example 3 and Examples 13–18.

FIG. 15 is a table for Comparative Example 4 and Examples 19–24.

FIG. 16 is a table for Comparative Example 5 and Examples 25–30.

FIG. 17 is a table for Comparative Example 6 and Examples 31–36.

DESCRIPTION OF THE PREFERRED EMBODIMENTS

The preferred embodiments of the present invention will be described below in detail with reference to the accompanying drawings. It is noted that identical or equivalent elements will be denoted by the same reference symbols throughout the description of the drawings, without redundant description.

Figure 1:
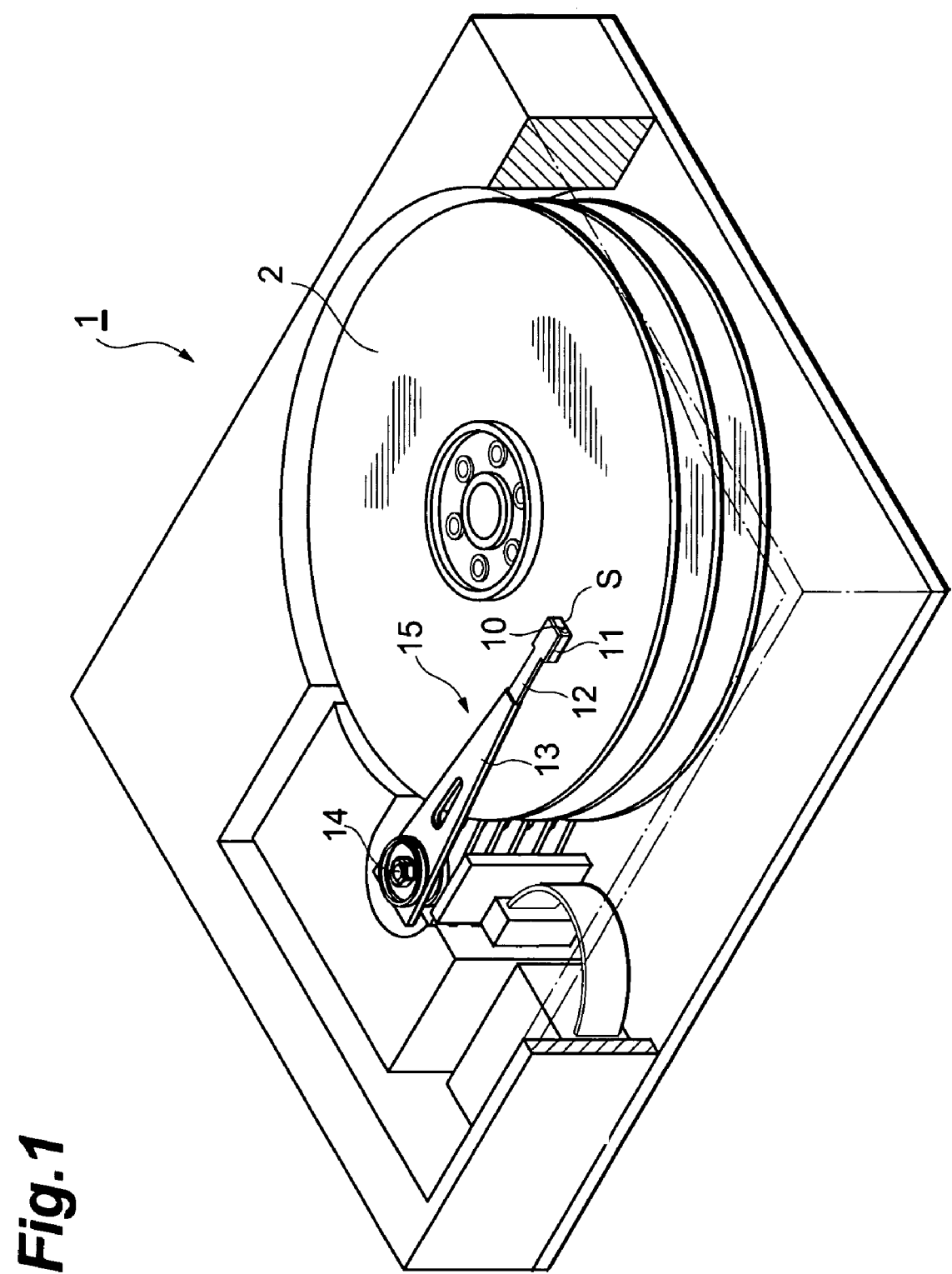
FIG. 1 is a perspective view showing an embodiment of the hard disk drive according to the present invention.

FIG. 1 is an illustration showing a hard disk drive provided with the thin-film magnetic head according to the present embodiment. The hard disk drive 1 is an apparatus configured to actuate a head gimbal assembly (HGA: Head Gimbal Assembly) 15 to make the thin-film magnetic head 10 record and read magnetic information into and from a recording surface (the upper surface in FIG. 1) of a hard disk (recording medium) 2 rotating at high speed. The head gimbal assembly 15 is provided with a gimbal 12 on which a head slider 11 with the thin-film magnetic head 10 formed thereon is mounted, and a suspension arm 13 connected to the gimbal, and is arranged rotatable about a spindle 14, for example, by a voice coil motor. With rotation of the head gimbal assembly 15, the head slider 11 moves in the radial direction of hard disk 2, i.e., in the direction crossing the track lines.

Figure 2:
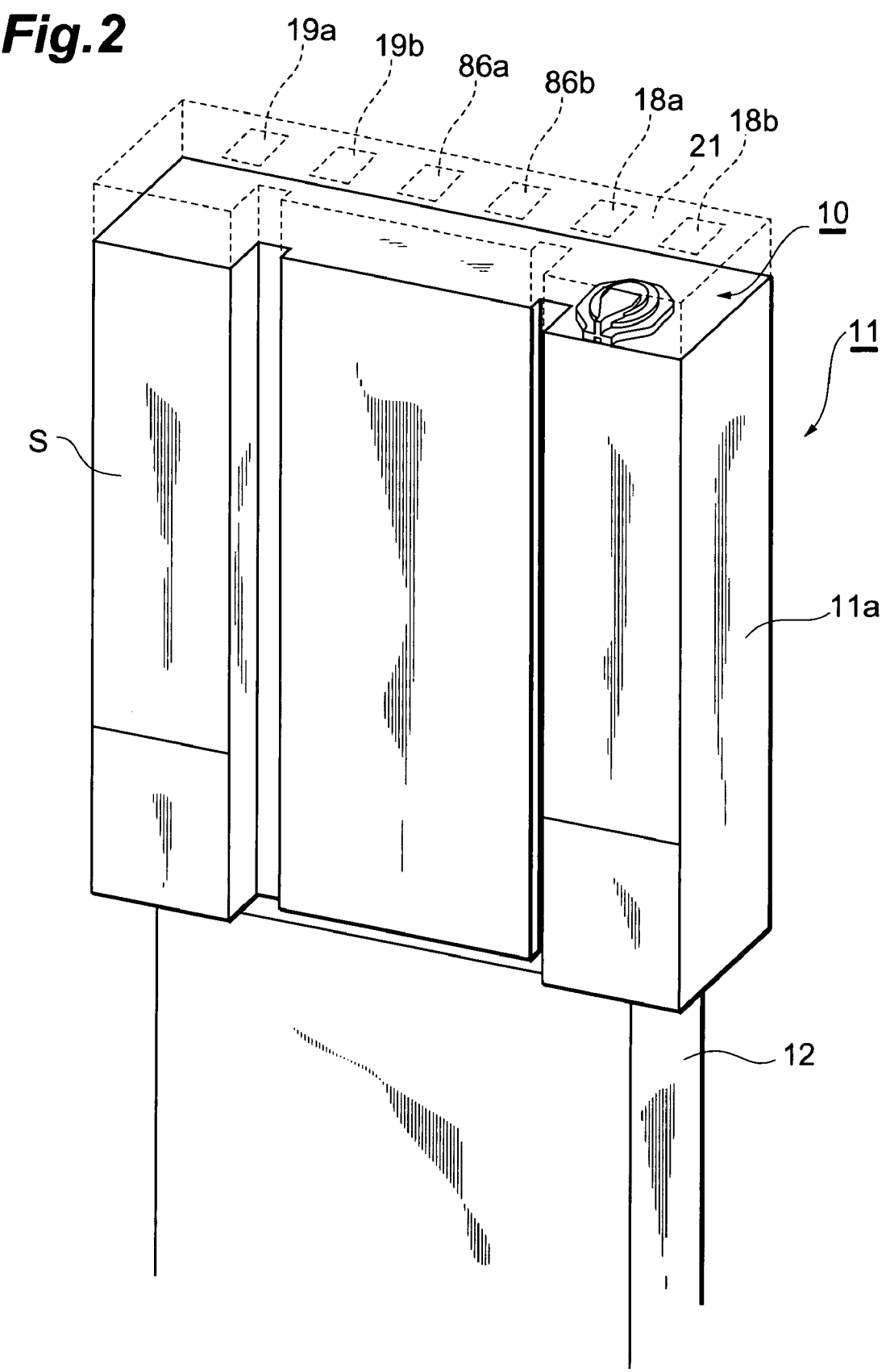
FIG. 2 is a perspective view showing a head slider.

FIG. 2 is an enlarged perspective view of the head slider 11. The head slider 11 is of almost rectangular parallelepiped shape and the thin-film magnetic head 10 is formed on a base 11a mainly made of AlTiC ($Al_2O_3 \cdot TiC$). This side in the same figure is a recording-medium-opposed surface opposed to the recording surface of hard disk 2, and is called an air bearing surface (ABS: Air Bearing Surface) S. During rotation of the hard disk 2, the head slider 11 flies because of an airflow made by the rotation, so that the air bearing surface S becomes spaced from the recording surface of hard disk 2. The thin-film magnetic head 10 is provided with an overcoat layer 21 (detailed later) indicated by dashed lines in the figure, for protecting the thin-film magnetic head 10. Pads for recording 18a, 18b, pads for reading 19a, 19b, and pads for later-described heater 86a, 86b are attached onto the overcoat layer 21, and wires for input/output of electric signals (not shown), which are connected to the respective pads, are attached to the suspension arm 13 shown in FIG. 1. The air bearing surface S may be coated with DLC (Diamond-Like Carbon) or the like.

Figure 3:
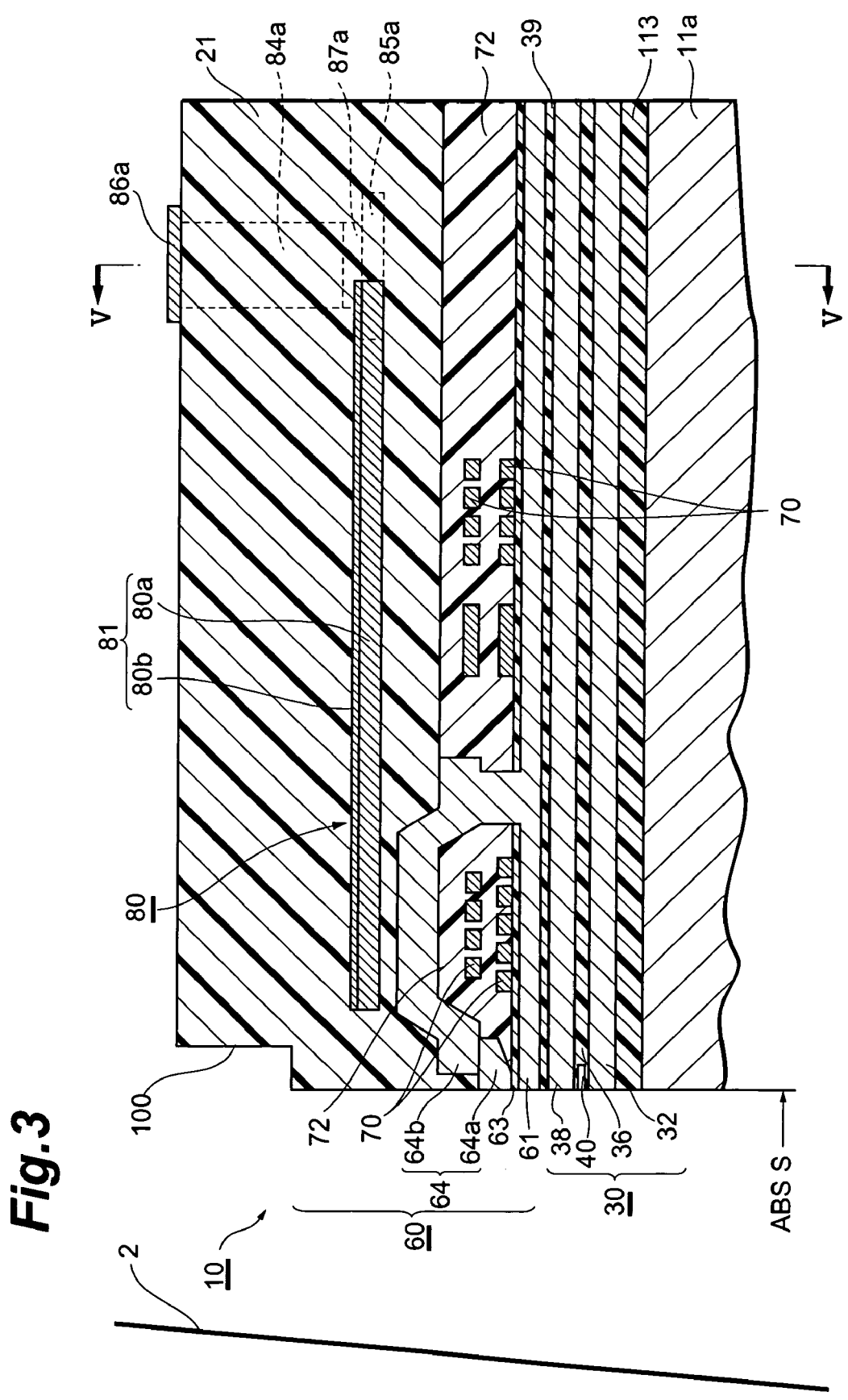
FIG. 3 is a sectional view showing the thin-film magnetic head according to the embodiment.
Figure 4:
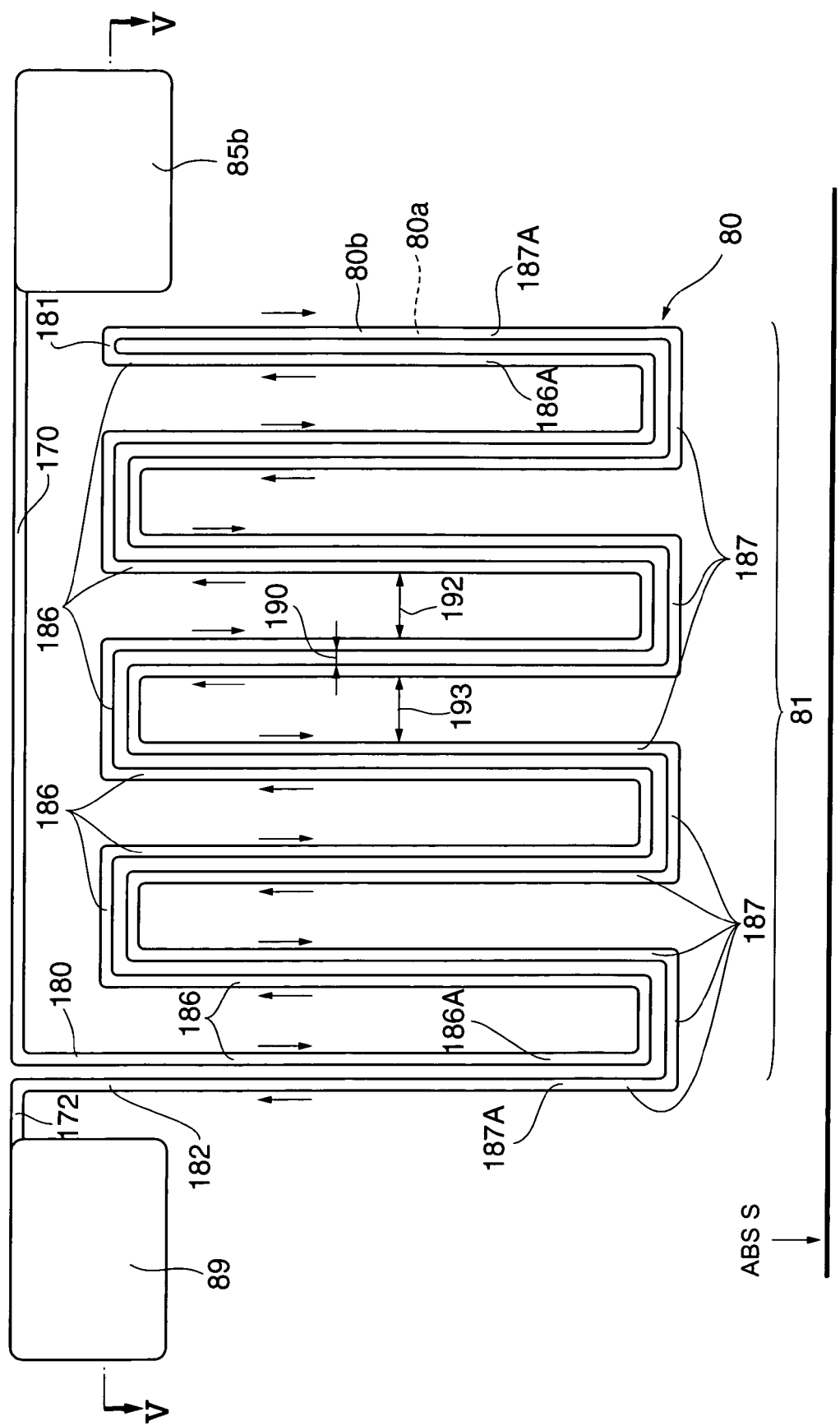
FIG. 4 is a plan view showing the heater of the thin-film magnetic head according to the embodiment.
Figure 5:
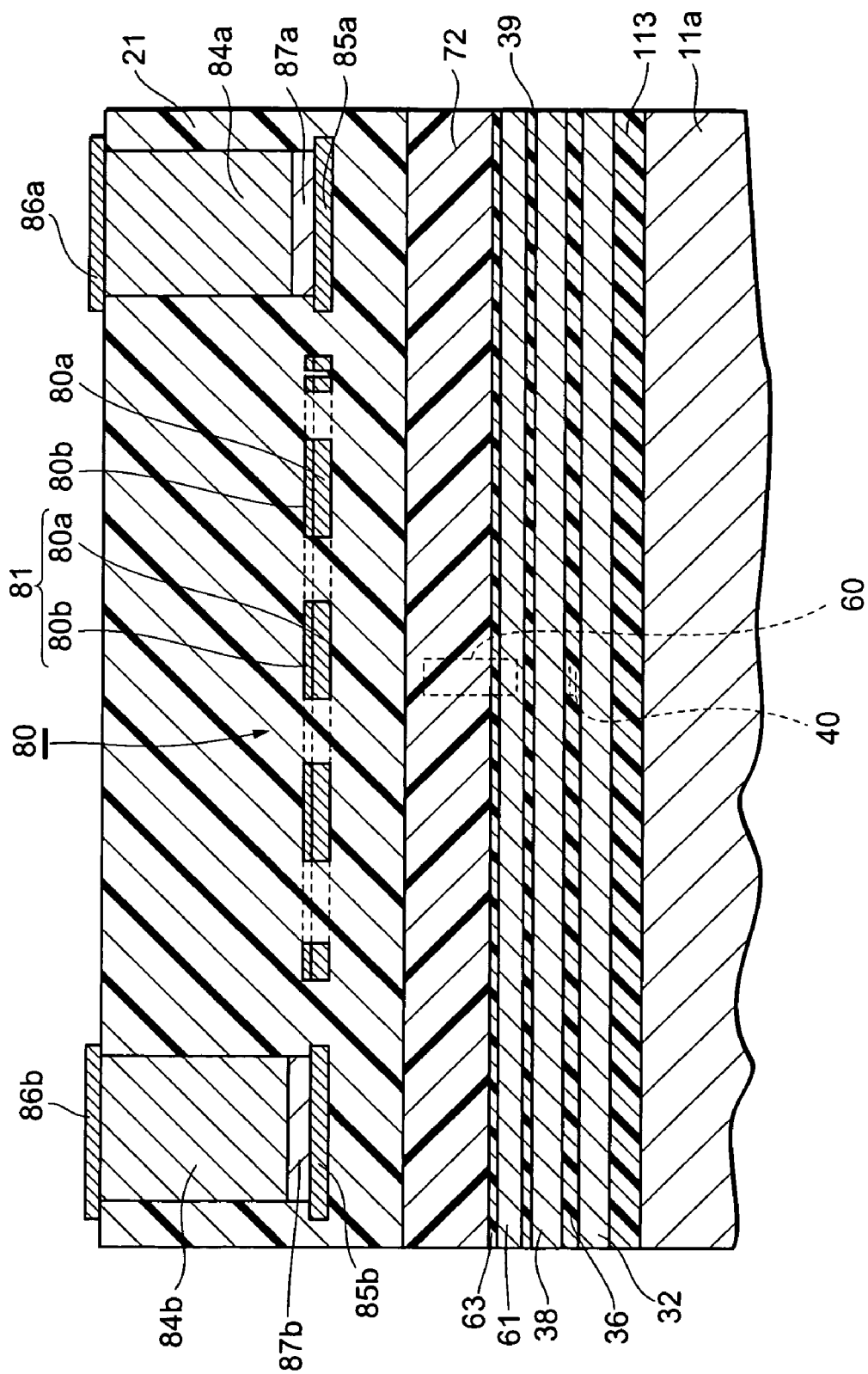
FIG. 5 is a sectional view along V—V of the thin-film magnetic head of FIG. 3.

FIG. 3 is a sectional view in the direction perpendicular to the air bearing surface S and to the track lines in the thin-film magnetic head 10. FIG. 4 is a plan view of the heater member in the thin-film magnetic head 10, in which the air bearing surface S is located on the bottom side. FIG. 5 is a sectional view parallel to the air bearing surface S of the thin-film magnetic head and view corresponding to a cut line V—V in FIGS. 3 and 4. The thin-film magnetic head 10 is a complex thin-film magnetic head formed on the base 11a and, as shown in FIG. 3, mainly having a reading head part 30 incorporating a GMR (Giant Magneto Resistive) device 40 as a magnetoresistive device, a recording head part 60 as an electromagnetic conversion device of an induction type, and an overcoat layer 21 provided on the recording head part 60, in the order named from the base 11a side.

The base 11a is a wafer-like substrate made of AlTiC ($Al_2O_3 \cdot TiC$) or the like. An undercoat layer 113 of an insulating material such as alumina is formed in the thickness of about 1 µm to about 10 µm on the base 11a.

The reading head part 30 is laid on the undercoat layer 113, and is constructed of a stack of a lower shield layer 32, an insulating layer 36 including the GMR device 40 and sandwiching this GMR device 40 up and down, and an upper shield layer 38 in the order named from the undercoat layer 113 side. The GMR device 40 is one making use of the giant magnetoresistance effect with large magnetoresistance variation, is of multilayer structure (not shown), and is exposed on the ABS side. The lower shield layer 32 and upper shield layer 38 have a function of preventing the GMR device 40 from sensing an unwanted external magnetic field and contain a magnetic material. The thickness of the lower shield layer 32 is in the range of approximately 1 µm to approximately 3 µm, and the thickness of the upper shield layer 38 in the range of approximately 1 µm to approximately 4 µm. The thickness of the insulating layer 36 is in the range of about 0.05 µm to 1.0 µm. The present specification sometimes uses the terms "upper" and "lower" like the shield layers, and these terms are defined so that the term "lower" means "close to the base 11a" and the term "upper" "distant from the base 11a."

The recording head part 60 is formed through an insulating layer 39 on the reading head part 30 and is an inductive magnetic conversion device of the longitudinal recording system. The insulating layer 39 can be made of alumina or the like in the thickness of approximately 0.1 µm to approximately 2.0 µm, but it is not always essential. The recording head part 60 has a lower magnetic pole 61 made of a soft magnetic material and a gap layer 63 made of a nonmagnetic insulating material, in the order named from the insulating layer 39 side. On the gap layer 63 a magnetic pole part layer 64a is stacked on the ABS side, and an insulating layer 72 including two stages of upper and lower thin-film coils 70 on the side apart from the ABS. Furthermore, on the magnetic pole part layer 64a and on the insulating layer 72, there is provided a yoke part layer 64b sandwiching part of the thin-film coils 70 between the yoke part layer 64b and the lower magnetic pole 61 and magnetically connecting to the lower magnetic pole 61 on the side apart from the air bearing surface S. The lower magnetic pole 61, gap layer 63, thin-film coils 70, insulating layer 72, and upper magnetic pole 64 constitute the recording head part 60.

The lower magnetic pole 61 is a magnetic material such as permalloy (NiFe) or the like and is formed, for example, in the thickness of approximately 1 µm to approximately 3 µm.

The gap layer 63 is a nonmagnetic insulator, such as alumina ($Al_2O_3$) or the like, or a combination of a nonmagnetic conductor with a nonmagnetic insulator and is formed, for example, in the thickness of approximately 0.05 µm to approximately 0.5 µm.

The magnetic pole part layer 64a, together with the yoke part layer 64b, constitutes the upper magnetic pole 64, and can be made, for example, of permalloy (NiFe), or a material selected from (1) materials containing iron and nitrogen atoms, (2) materials containing iron, zirconia, and oxygen atoms, (3) materials containing iron and nickel elements, and so on. The thickness of the magnetic pole part layer 64a is, for example, in the range of about 0.5 µm to about 3.5 µm and preferably in the range of 1.0 µm to 2.0 µm.

The yoke part layer 64b is made of a material similar to that of the magnetic pole part layer 64a and has, for example, the thickness of about 1 µm to about 5 µm.

The thin-film coils 70 are conductors of Cu or the like and each coil has the thickness of about 1 µm to about 3 µm, for example.

The insulating layer 72 is an insulator such as alumina, a resist, or the like and has the thickness of about 0.1 µm to about 3 µm, for example.

When a recording current is allowed to flow through the thin-film coils 70, magnetic flux is generated between the magnetic pole part layer 64a and the lower magnetic pole 61, so as to enable recording of information into the recording medium 2 such as the hard disk or the like.

The overcoat layer 21 is a layer made of an insulating material such as alumina or the like for protecting the recording head part 60 of the thin-film magnetic head 10, and is provided in the thickness of about 5.0 μm to about 30 μm on the recording head part 60. In the overcoat layer 21, a cut portion 100 is formed in the ridge region formed by the ABS and the top surface farthest from the base 11a.

In the present embodiment, particularly, a heater member 80 is provided in this overcoat layer 21, as shown in FIGS. 3–5. This heater member 80 is formed so as to be spaced by a predetermined distance from the ABS S and parallel to the upper shield layer 38 and others in the overcoat layer 21.

The heater member 80 has, as shown in FIG. 4, a heating portion 81 of a line meandering in the layer, and extraction electrodes 85a, 85b connected to the both ends of this heating portion 81, and forms a current-carrying path of a predetermined length.

More specifically, the heating portion 81 has an up portion 186 formed so as to meander in the rectangular wave shape from a predetermined origin 180 to a halfway point 181, a down portion 187 formed so as to meander back along the up portion 186 from the halfway point 181 to an end 182 positioned in the vicinity of the origin 180, a connection portion 170 connecting the origin 180 and the extraction electrode 85b, and a connection portion 172 connecting the end 182 and the extraction electrode 85a. A spacing 190 between parts of the up portion 186 and the down portion 187 formed next to each other is narrower than a spacing 192 between parts of the up portion 186 facing each other and narrower than a spacing 193 between parts of the down portion 187 facing each other.

The heating portion 81 of the heater member 80 has the vertically two-layer structure, as shown in FIGS. 3 and 5, and is comprised of a heater layer 80a made of a material with a predetermined electrical resistivity, and a cap layer 80b made of a material with an electrical resistivity higher than that of the heater layer 80a, which is laid immediately above the heater layer 80a. As apparent from FIGS. 3 to 5, the heater layer 80a and the cap layer 80b are formed in much the same shape on the view from the direction normal to the base 11a, and the cap layer 80b has the shape corresponding to the heater layer 80a of predetermined shape.

The thickness of the heater layer 80a is, for example, in the range of approximately 100 to 200 nm and the thickness of the cap layer 80b, for example, in the range of approximately 10 to 20 nm.

The material of the heater layer 80a preferably contains one selected from Cu, Au, Ni, Co, Ta, W, Mo, Rh, and alloys of these.

The material of the cap layer 80b preferably contains one selected from Ta, Ti, Pt, Ru, Rh, Hf, Cr, Ni, Co, W, Mo, Rh, and alloys of these.

The electrical resistivity of the material of the cap layer 80b is preferably four or more times that of the material of the heater layer 80a, and this enables us to control the variation in the resistance of the heater member 80 in each thin-film magnetic head to 2% or less as detailed later.

The extraction electrodes (corresponding to the exposed portions of the heater layer) 85a, 85b of the heater member 80 are made of the same material as the heater layer 80a of the heating portion 81. Electrically conductive electrode film members 87a, 87b are formed on the extraction electrodes 85a, 85b, respectively, as shown in FIGS. 3 and 5. Upwardly extending bumps 84a, 84b are provided on the electrode film members 87a, 87b, respectively, and they are formed by electroplating using the electrode film members 87a, 87b as an electrode. The electrode film members 87a, 87b and bumps 84a, 84b are made of an electrically conductive material such as Cu or the like, the thickness of the electrode film members 87a, 87b is in the range of approximately 10 to 200 nm, and the thickness of the bumps 84a, 84b in the range of approximately 10 to 30 μm.

The upper ends of the bumps 84a, 84b are exposed through the overcoat layer 21 to the outside, and the heater pads 86a, 86b are attached to the respective exposed surfaces of the bumps. An electric current is supplied through the heater pads 86a, 86b to the heater member 80. Similarly, the recording head part 60 is connected to the recording pads 18a, 18b (cf. FIG. 2), and the magnetoresistive device 40 of the reading head part 30 to the reading pads 19a, 19b, but they are omitted from the illustration for simplicity in FIGS. 3 and 5.

Figure 6:
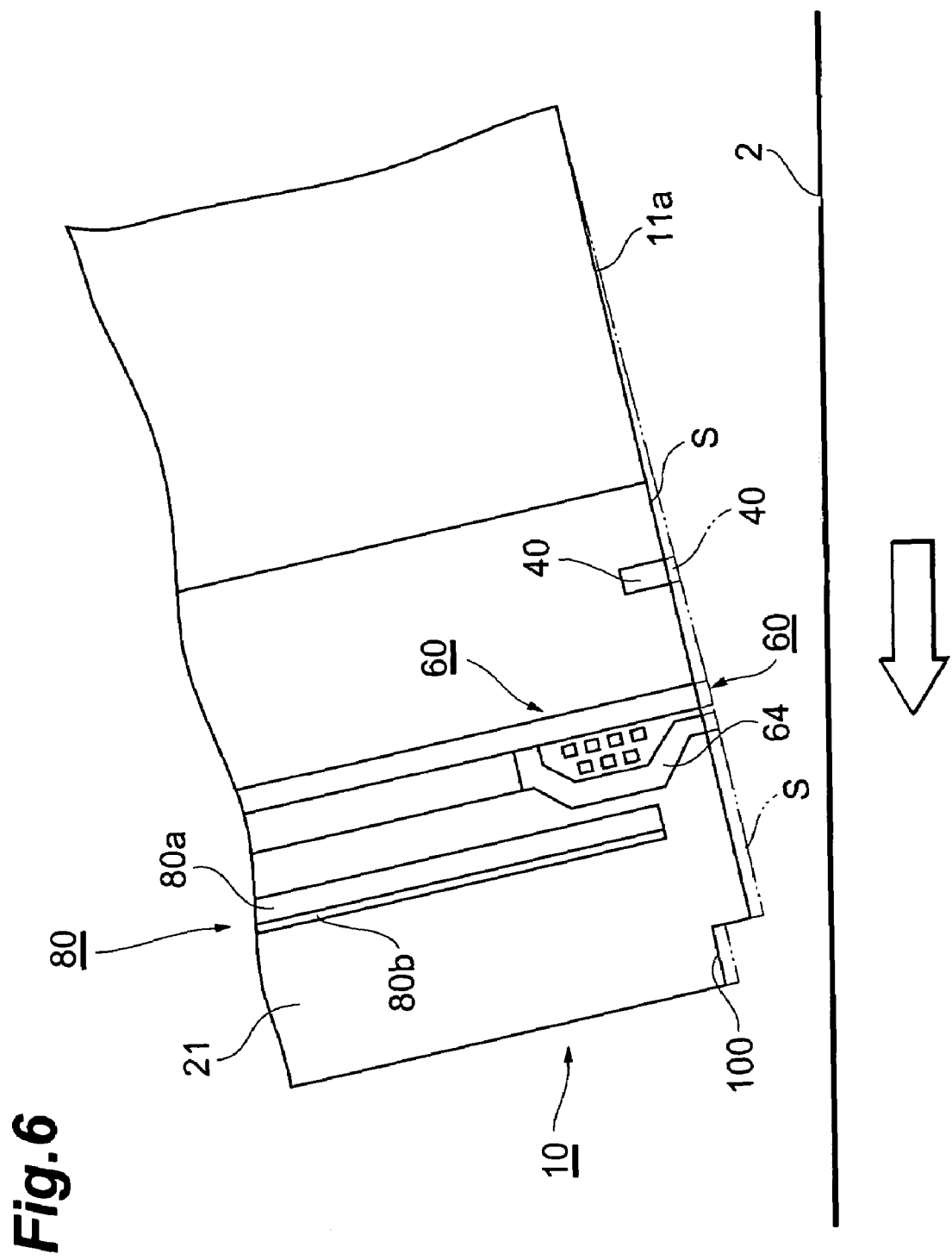
FIG. 6 is a schematic view showing a state in which the thin-film magnetic head in the embodiment is thermally expanded.

Now, the operations of the thin-film magnetic head 10, head gimbal assembly 15, and hard disk drive 1 constructed as described above will be described. As shown in FIG. 6, as the hard disk 2 rotates in the direction of an arrow in the figure, the thin-film magnetic head 10 comes to fly because of the airflow and the upper magnetic pole 64 side of the recording head part 60 is held so as to lean forward toward the hard disk 2 (in a forward tilting posture). When the heater member 80 is energized in this state, the surrounding area of the heater member 80 in the thin-film magnetic head 10 is thermally expanded by heat generated from the heater member 80, so that the ABS S side of the thin-film magnetic head 10 and base 11a projects toward the recording medium 2 as indicated by chain double-dashed lines. This results in decreasing the spacing between the hard disk 2 and the GMR device 40/the recording head part 60, which enables attainment of high read output and writing in higher density and the like. By controlling the level of energization of the heater member 80, it becomes feasible to adjust the amount of projection and, in turn, control the distance between the recording medium 2 and the recording head part 60/GMR device 40.

According to the present embodiment, the heating portion 81 of the heater member 80 constitutes a parallel circuit consisting of a stack of the heater layer 80a with the low electrical resistivity and the cap layer 80b with the higher electrical resistivity. In the process of production of this thin-film magnetic head (as detailed later), the cap layer 80b being the upper layer of the heater member 80 is removed by a predetermined thickness, so that variation can occur in the thickness of the cap layer 80b among thin-film magnetic heads. In the thin-film magnetic head 10 of the present embodiment, however, the contribution of the cap layer 80b with the higher electrical resistivity is smaller than the contribution of the heater layer 80a with the low electrical resistivity, to the total resistance of the heating portion 81 of the heater member 80. For this reason, even if variation occurs in the thickness of the cap layer 80b in each thin-film magnetic head 10, the variation in the resistance of the heater member 80 is smaller than that among cases made without the cap layer 80b and experiencing the variation in the thickness of the heater layer 80a.

Since the heater member 80 is provided in the overcoat layer 21, the structure is simpler than in cases where the heater is located in the part below the GMR device 40 and the recording head part 60 or in the part at the height equal to the GMR device 40 and the recording head part 60, and this facilitates the production of the thin-film magnetic head.

Since the heater member 80 is provided in the overcoat layer 21 while the recording head part 60 is located between the overcoat layer 21 and the GMR device 40, the spacing between the GMR device 40 and the heater member 80 is wider than the spacing between the recording head part 60 and the heater member 80. For this reason, the GMR device 40 relatively susceptible particularly to generated heat is less likely to be adversely affected by high temperature, which can enhance reliability.

Since the cut portion 100 is formed in the overcoat layer 21 of the thin-film magnetic head 10, the ABS S of the thin-film magnetic head 10 is less likely to contact the recording medium 2 even in a state in which it is projected toward the hard disk 2 because of thermal expansion. The shape of this cut portion 100 is not limited to the single-step inverted L-shaped form in the present embodiment, but may be a multi-step cut, a cut with a slant face, or the like.

Furthermore, in the heater member 80, as shown in FIG. 4, the up portion 186 and the down portion 187 meander next to each other and, therefore, the magnetic fields generated by the up portion 186 and by the down portion 187 between the halfway point 181 and, the origin 180 and end 182 cancel each other, as apparent from the Ampere right-handed screw rule. This decreases the leakage of magnetic fields, so as to cause little adverse effect on the recording head part 60 and the magnetoresistive device 40. Since the spacing 190 is narrower than the spacing 193 and the spacing 192, the parts of up portion 186 and down portion 187 proximate to each other are less affected by the magnetic fields from the other parts of up portion 186 and down portion 187 distant from the proximate parts of up portion 186 and down portion 187 in question, whereby the magnetic fields generated through the energization are canceled out more suitably. For this reason, the leakage of the magnetic fields is decreased, particularly, from the outermost regions 186A, 187A of the up portion and down portion of the heater member 80 arranged next to each other.

As described above, the present embodiment provides the thin-film magnetic head 10, head gimbal assembly 15, and hard disk drive 1 capable of decreasing the distance to the hard disk 2 and achieving higher density.

Figure 7:
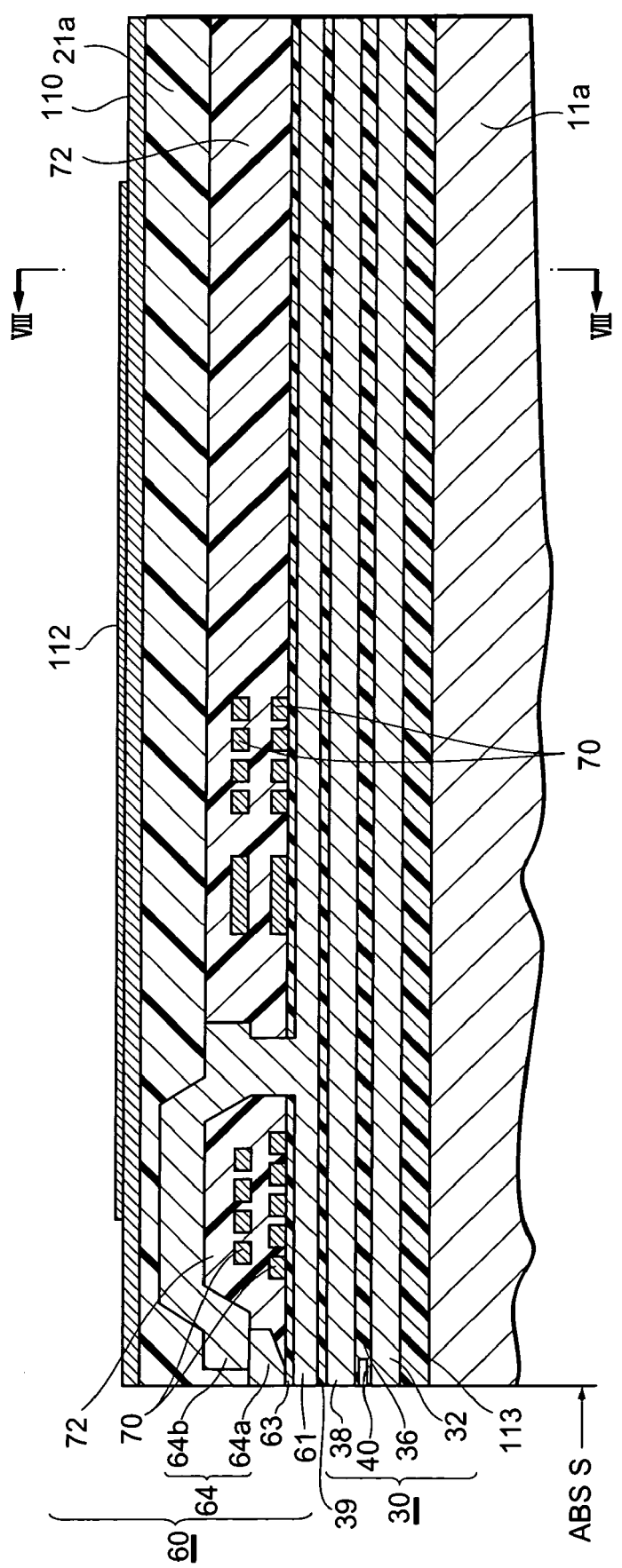
FIG. 7 is an illustration showing a production method of the thin-film magnetic head according to the embodiment.

An example of the production method of the thin-film magnetic head according to the present embodiment will be described below with reference to FIGS. 7 to 11. FIG. 7 is a sectional view in the direction normal to the air bearing surface S and to the track lines in the thin-film magnetic head, and FIG. 8 a sectional view of the thin-film magnetic head in the state of FIG. 7 in the direction parallel to the air bearing surface S and view corresponding to the cut line VIII—VIII. The description will be simplified as to the well-known production steps.

Figure 8:
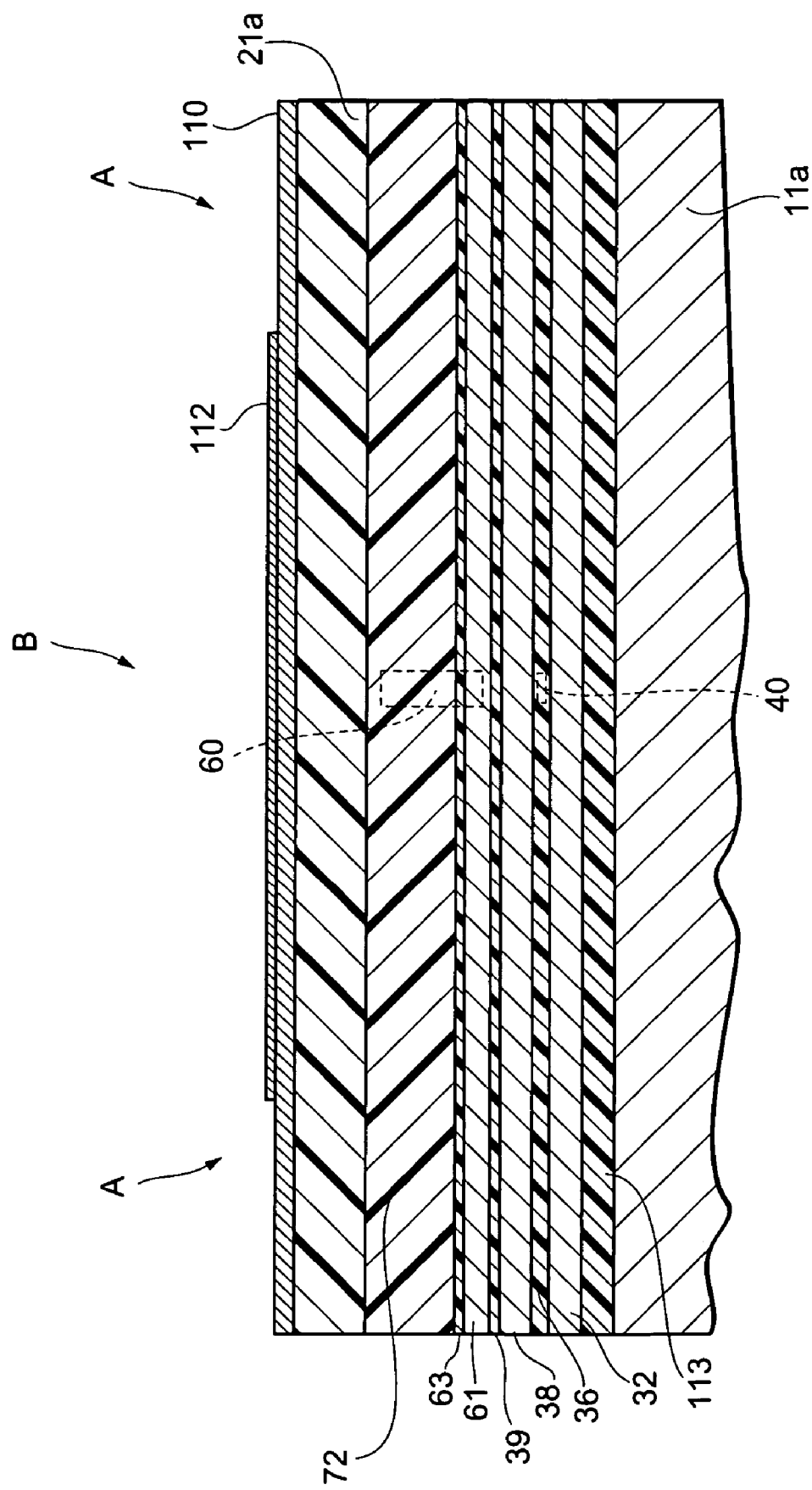
FIG. 8 is a sectional view along VIII—VIII in FIG. 7.

At the first step, as shown in FIGS. 7 and 8, the undercoat layer 113 of an insulating material, for example, such as alumina ($Al_2O_3$) is formed by sputtering on the base 11a being a substrate of AlTiC ($Al_2O_3.TiC$) or the like.

At the next step, the lower shield layer 32 of a magnetic material such as permalloy is formed, for example, by plating on the undercoat layer 113. Furthermore, the GMR device 40, and the insulating layer 36 of $Al_2O_3$ or the like embracing it from top and bottom and from left and right are formed on the lower shield layer 32 by known techniques. The GMR device 40 is comprised of a plurality of films in fact, but it is illustrated as a single layer in the figure. This GMR device 40 is formed on the ABS side. Subsequently, the upper shield layer 38 is formed on the insulating layer 36, for example, by plating. The above yields the reading head part 30.

At the next step, the insulating layer 39 of an insulating material such as $Al_2O_3$ is formed, for example, by sputtering on the upper shield layer 38.

Subsequently, the lower magnetic pole 61 of permalloy is formed on the insulating layer 39, for example, by sputtering. Next, the gap layer 63 of a nonmagnetic insulator, or a combination of a nonmagnetic conductor with a nonmagnetic insulator is formed on the lower magnetic pole 61, for example, by sputtering. Furthermore, the insulating layer 72 with the two-stage thin-film coils 70, the magnetic pole part layer 64a of the upper magnetic pole 64, and the yoke part layer 64b of the upper magnetic pole 64 are formed on the gap layer 63 by known methods using photolithography, dry etching, and so on. At this step, they are formed so that part of the thin-film coils 70 is interposed between the lower magnetic pole 61 and the upper magnetic pole 64. The two-step thin-film coils 70 are formed in the present embodiment; however, the number of steps is not limited to this example and helical coils or the like may be formed. This completes the recording head part 60.

At the next step, a nonmagnetic overcoat lower layer 21a is formed so as to cover the recording head part 60. Then a heater material layer 110 of an electrically conductive material is formed on the overcoat lower layer 21a by sputtering. The electrically conductive material of the heater material layer 110 preferably contains one selected from Cu, Au, Ni, Co, Ta, W, Mo, Rh, and alloys of these. Specific examples of the electrically conductive material of the heater material layer 110 include single metals of Cu, Au, Mo, and Rh, alloys such as an NiFe alloy and a CoFe alloy, and so on.

Furthermore, a cap material layer 112 of a material with an electrical resistivity higher than that of the heater material layer 110 is laid on a portion where the heating portion 81 of the heater member 80 should be formed (B in FIG. 8), in the region of the heater material layer 110. This results in not laying the cap material layer 112 over the portions where the extraction electrodes 85a, 85b should be formed (A in FIG. 8), in the region of the heater material layer 110, so that exposed portions of the heater material layer 110 are formed.

There are no specific restrictions on the material of the cap material layer 112 as long as the electrical resistivity thereof is larger than that of the heater material layer 110. Preferred materials for the cap material layer 112 include electrically conductive materials containing one of Ta, Ti, Pt, Ru, Rh, Hf, Cr, Ni, Co, W, Mo, Rh, and alloys of these, and insulating materials such as alumina. Specifically, the electrically conductive materials for the cap material layer 112 include, for example, single metals of Ti and Ta, alloys such as NiFeNb, AuCu, and AuNi, and so on.

Figure 9:
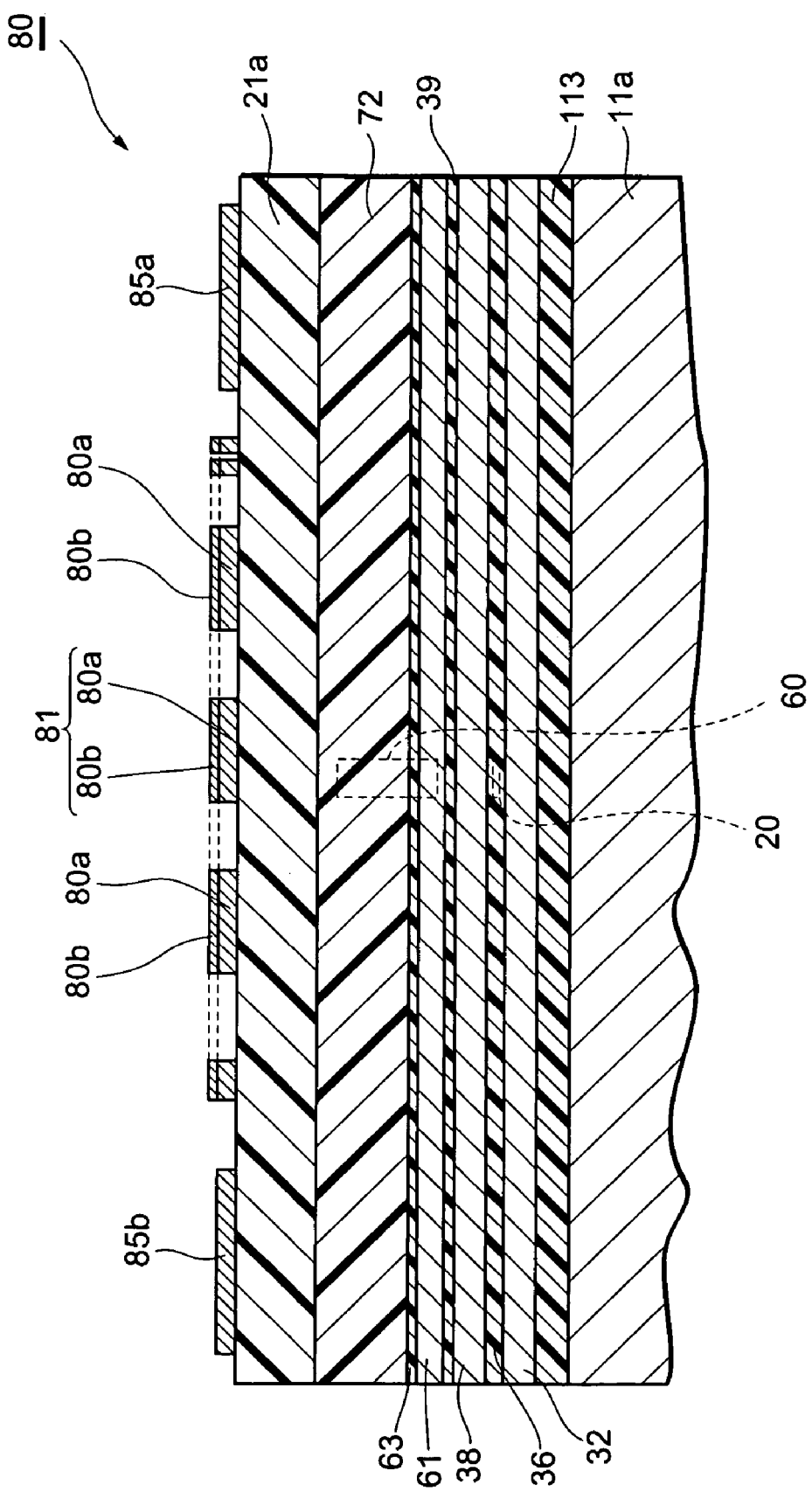
FIG. 9 is an illustration subsequent to FIG. 8 to illustrate the production method of the thin-film magnetic head according to the embodiment.

Then part of the exposed portions of the heater material layer 110 is removed to the top surface of the overcoat under layer 21a by ion milling or the like, thereby forming the extraction electrodes (corresponding to the exposed portions of the heater layer) 85a, 85b as shown in FIG. 9. At the same time as it, part of the laminate portion of the heater material layer 110 and the cap material layer 112 is removed to the top surface of the overcoat under layer 21a by ion milling or the like, thereby forming the meandering heating portion 81 as shown in FIG. 9. This forms the heater member 80. Here the heating portion 81 of the heater member 80 is constructed of the heater layer 80a and cap layer 80b.

Figure 10:
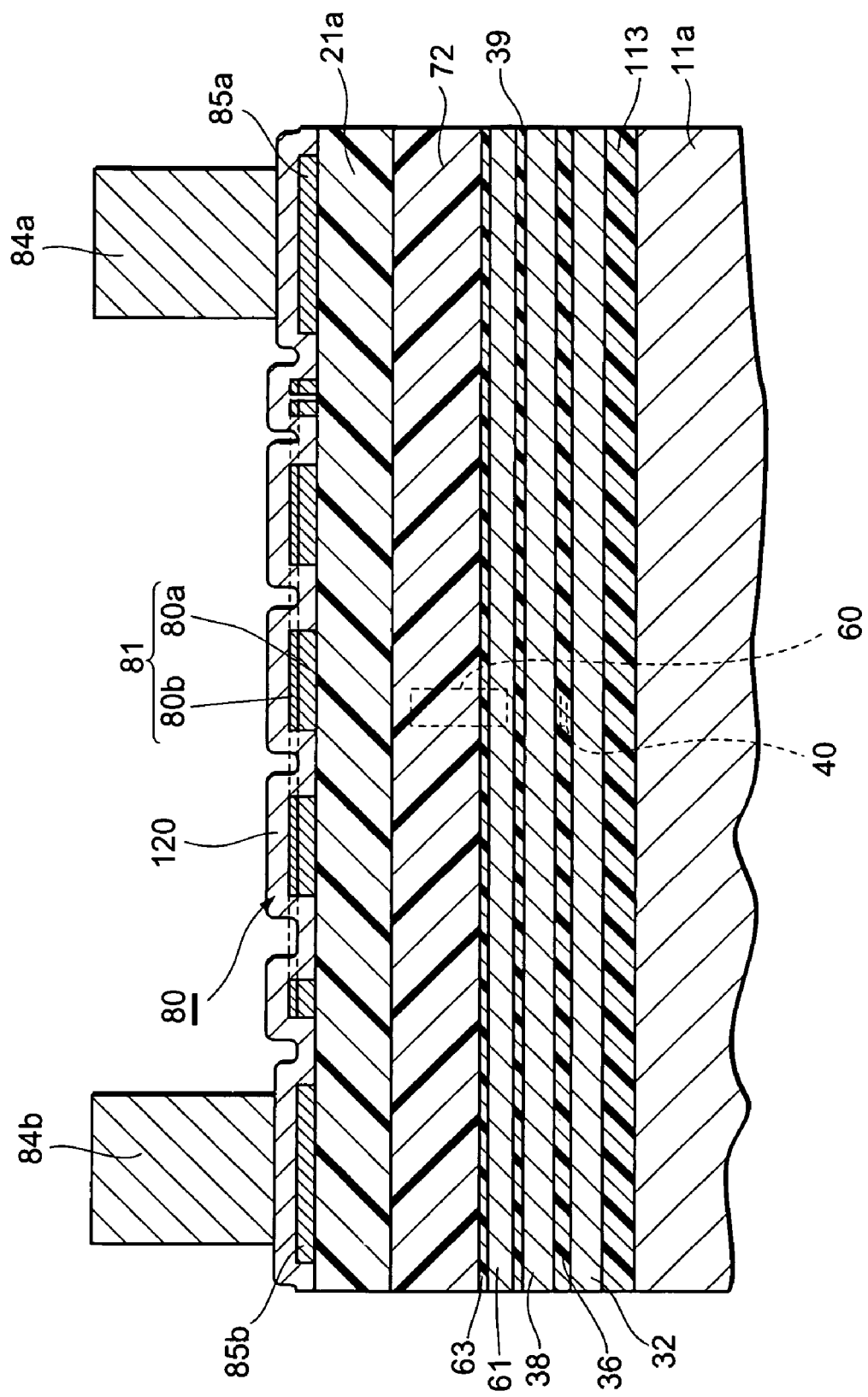
FIG. 10 is an illustration subsequent to FIG. 9 to illustrate the production method of the thin-film magnetic head according to the embodiment.

Then, as shown in FIG. 10, an electrode film 120 for plating of an electrically conductive material such as Cu or the like is deposited in a predetermined thickness, e.g., 10 nm–200 nm, by sputtering or the like over the exposed portions of the heating portion 81 of the heater member 80, the extraction electrodes 85a, 85b of the heater member 80, and the overcoat under layer 21a.

Then the upwardly extending bumps 84a, 84b are formed on the portions of the electrode film 120 in contact with the respective extraction electrodes 85a, 85b, by a plating method using the electrode film 120 as an electrode.

Figure 11:
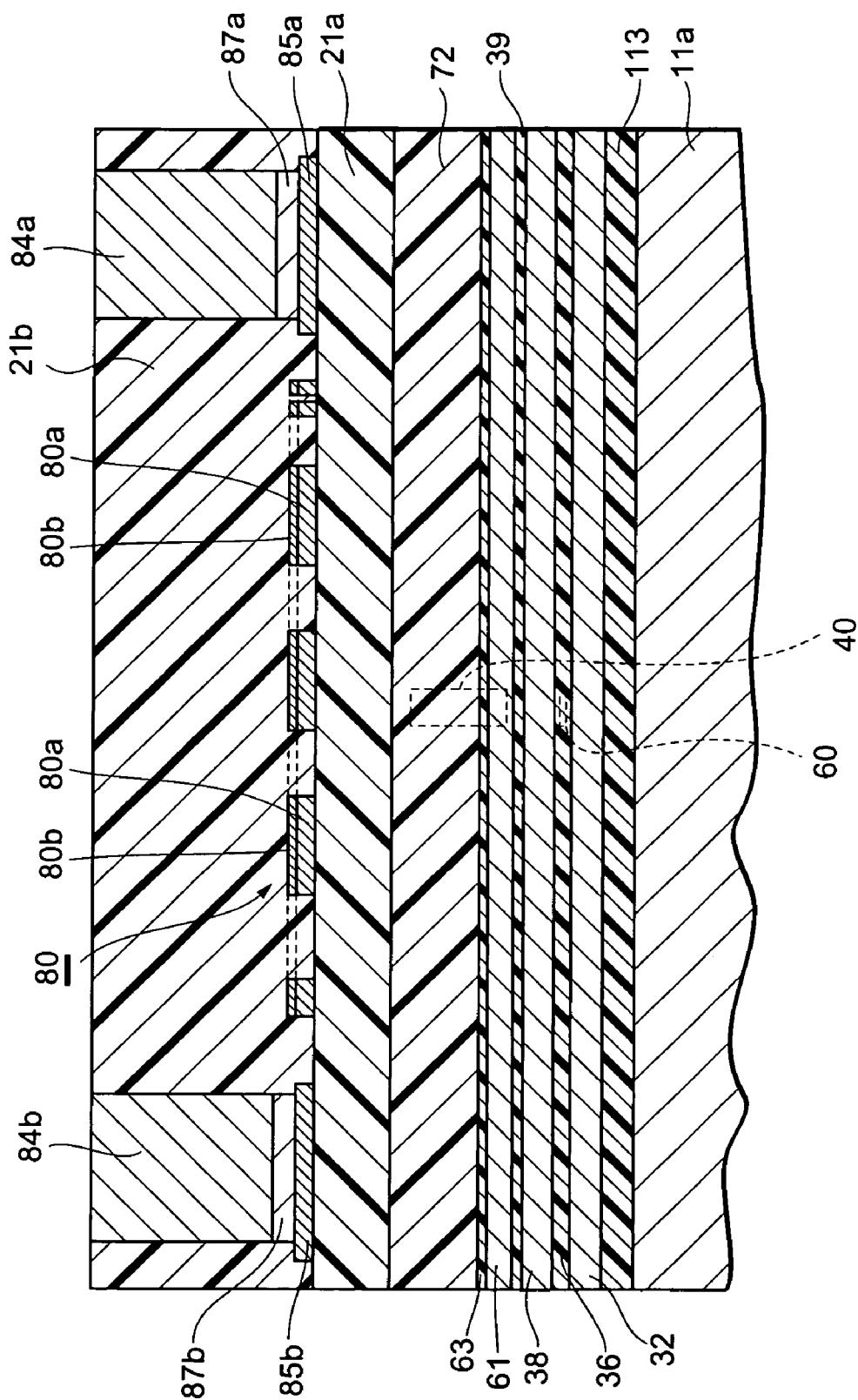
FIG. 11 is an illustration subsequent to FIG. 10 to illustrate the production method of the thin-film magnetic head according to the embodiment.

Then, as shown in FIG. 11, the electrode film 120 exposed to the outside is removed by milling or the like, using the bumps 84a, 84b as a mask. At this time, the electrode film 120 exposed to the outside is completely removed in order to avoid a short circuit between the extraction electrodes 85a, 85b or the like, so that the cap layer 80b is also removed by a predetermined thickness immediately below the electrode film 120, so as to decrease the thickness of the cap layer 80b. On this occasion, the electrode film 120 below the bumps 84a, 84b remains without being removed, so as to function as electrode film members 87a, 87b. It is important herein, particularly, to set the conditions for the removal of the electrode film 120 so as to leave the cap layer 80b.

Thereafter, an insulating material such as $Al_2O_3$ or the like is deposited as an upper layer by sputtering or the like, and the insulating material is ground, for example, by polishing to the desired height to expose the upper surface of the bumps 84a, 84b, thus forming an overcoat upper layer 21b. Thereafter, the heater pads 86a, 86b are provided on the exposed portions at the upper ends of the bumps 84a, 84b. Here the overcoat under layer 21a and overcoat upper layer 21b correspond to the overcoat layer 21. Although not shown, the unrepresented recording pads and reading pads are also formed in this step. Furthermore, the ridge of the overcoat layer 21 is cut to form the cut portion 100, though not shown.

The above completes the thin-film magnetic head 10 according to the present embodiment, as shown in FIGS. 3 to 5.

The heater member 80 is suitably formed in the thin-film magnetic head 10 by the production method of the thin-film magnetic head according to the present embodiment. In the thin-film magnetic head 10 of this structure, the heater member 80 is energized in operation to generate heat, as described above, so as to thermally expand the thin-film magnetic head 10, whereby the distance is decreased between the recording medium 2 and the GMR device 40/recording head part 60 of the thin-film magnetic head 10.

Since the heating portion 81 consisting of the stack of the heater layer 80a with the low electrical resistivity and the cap layer 80b with the higher electrical resistivity is formed in the step of forming the heater member 80, part of the cap layer 80b with the higher electrical resistivity in the heating portion 81 of the heater member 80 is also removed together with the electrode film 120 during the removal of the electrode film 120. Since the contribution of the cap layer 80b with the higher electrical resistivity is smaller than that of the heater layer 80a with the low electrical resistivity, to the sheet resistance of the entire heating portion 81 of the heater member 80, the variation can be reduced in the total resistance of the heating portion 81 of the heater member 80 even if the thickness of the cap layer 80b varies among thin-film magnetic heads because of the removal of the cap layer 80b during the removal of the electrode film 120. For this reason, it is feasible to suitably control the heat generated by the heater member 80 in operation.

In the thin-film magnetic head 10 according to the present embodiment, the heater member 80 is formed in the step of forming the relatively simple overcoat layer 21, which is carried out after the step of forming the relatively complex reading head part 30 and recording head part 60. For this reason, the magnetic head of the present embodiment can be produced at lower cost than in the cases where the heater member 80 is provided in the part below the reading head part 30 and the recording head part 60 or where the heater member 80 is provided in the part at the height equal to that of the recording head part 60 and the reading head part 30.

Since the heater material layer 110 and cap material layer 112 are formed by sputtering, the variation can be reduced in the thicknesses of these layers and the variation can also be reduced in the resistance of the heater member 80 among thin-film magnetic heads 10.

Subsequently, a slider rail is formed in the base 11a by ion milling or the like, to obtain the head slider 11 shown in FIG. 2. This head slider 11 is mounted on the gimbal 12 and thereafter the gimbal is connected to the suspension arm 13, thus completing the head gimbal assembly 15 shown in FIG. 1. After the fabrication of the head gimbal assembly 15, the components are assembled so that the head slider 11 is movable over the hard disk 2 and capable of recording and reading magnetic signals into or from the hard disk, thereby completing the hard disk drive 1 shown in FIG. 1.

Now, the effect of the present embodiment capable of reducing the variation in the sheet resistance of the heater member 80 will be described specifically with examples and comparative examples. In the examples and comparative examples below, attention is focused on the heating portion 81 of the heater member 80 and how much the variation of the heating portion 81 itself is reduced is determined by calculation.

Comparative Example 1 is a case in which the heater layer 80a of the heating portion 81 is made of NiFe of Ni 80 wt % and Fe 20 wt % (electrical resistivity 23 μΩ·cm), without the cap layer 80b. In this case, the step of removing the electrode film 120 laid on the heater layer 80a results in the variation of 10 nm in the thickness of the heater layer 80a removed together with the electrode film 120, to obtain the heating portion 81 with the heater layer 80a in the thickness of 150 nm and the heating portion 81 with the heater layer 80a in the thickness of 140 nm. At this time, the sheet resistances of the respective heating portions 81 are 1.533 Ω and 1.643 Ω to yield the sheet resistance variation of 7.2%. With the sheet resistance SR1 and the sheet resistance SR2 (SR2>SR1), the sheet resistance variation is defined by (SR2−SR1)/(SR1).

On the other hand, Example 1 is a case where the same heater layer 80a as in Comparative Example 1 is formed in the thickness of 150 nm and, in addition thereto, the cap layer 80b is formed of NiFeNb (electrical resistivity 45 μΩ·cm) resulting from addition of Nb 5 wt % to NiFe of Ni 80 wt % and Fe 20 wt % and where the step of removing the electrode film 120 results in the variation of 10 nm in the thickness of the cap layer 80b removed together with the electrode film 120, to obtain the heating portion 81 with the cap layer 80b in the thickness of 20 nm and the heating portion 81 with the cap layer 80b in the thickness of 10 nm. In this case, the sheet resistances of the respective heating portions 81 are 1.436 Ω and 1.483 Ω to yield the sheet resistance variation of 3.3%. Therefore, the variation is largely reduced as compared with that in Comparative Example 1.

Examples 2 to 6 are cases similar to Example 1 except that the material of the cap layer 80b is NiFeNb (electrical resistivity 70 μΩ·cm) resulting from addition of Nb 10 wt % to NiFe of Ni 80 wt % and Fe 20 wt %, NiFeNb (electrical resistivity 90 μΩ·cm, equivalent to 3.9 times the electrical resistivity of the heater layer) resulting from addition of Nb 14 wt % to NiFe of Ni 80 wt % and Fe 20 wt %, NiFeNb (electrical resistivity 120 μΩ·cm, equivalent to 5.2 times the electrical resistivity of the heater layer) resulting from addition of Nb 20 wt % to NiFe of Ni 80 wt % and Fe 20 wt %, Ti (electrical resistivity 180 μΩ·cm), or Ta (electrical resistivity 180 μΩ·cm), respectively. They demonstrated the sheet resistance variations of the heater of 2.1, 1.6, 1.3, 0.8, and 0.8% in order. The results of these are presented in FIG. 12. As described, it is seen that the variation decreases as the electrical resistivity of the cap layer increases relative to that of the heater layer.

Next, Comparative Example 2 is a case where the heater layer 80a of the heating portion 81 is made of Cu (electrical resistivity 3 μΩ·cm), without the cap layer 80b, and where the step of removing the electrode film 120 results in the variation of 10 nm in the thickness of the heater layer 80a removed together with the electrode film 120, to obtain the heating portion with the heater layer 80a in the thickness of 120 nm and the heating portion with the heater layer 80a in the thickness of 110 nm. In this case, the sheet resistance variation is 9.2%.

In contrast to it, Example 7 is a case where the same heater layer 80a as in Comparative Example 2 is formed in the thickness of 120 nm and, in addition thereto, the cap layer 80b is formed of AuCu (electrical resistivity 7.5 μΩ·cm) of Cu 5 at % and where the step of removing the electrode film 120 results in the variation of 10 nm in the thickness of the cap layer 80b removed together with the electrode film 120, to obtain the heating portion with the cap layer 80b in the thickness of 20 nm and the heating portion with the cap layer 80b in the thickness of 10 nm. Examples 8 to 12 are cases similar to Example 7 except that the material of the cap layer 80b is AuNi of Ni 5 at % (electrical resistivity 10.5 μΩ·cm), AuNi of Ni 7 at % (electrical resistivity 12 μΩ·cm, equivalent to four times the electrical resistivity of the heater layer), AuNi of Ni 10 at % (electrical resistivity 15 μΩ·cm), NiFe (electrical resistivity 23 μΩ·cm), or CoFe (electrical resistivity 20 μΩ·cm), respectively. The sheet resistance variations of the heater in Examples 7 to 12 were 3.9, 2.5, 2.0, 1.7, 0.8, and 1.2% in order. The results of these are presented in FIG. 13.

Next, Comparative Example 3 is a case where the heater layer 80a of the heating portion 81 is made of Au in the thickness of 120 nm (electrical resistivity 3.5 μΩ·cm), without the cap layer 80b, and where the step of removing the electrode film 120 results in the variation of 10 nm in the thickness of the heater layer 80a removed together with the electrode film 120, so as to obtain the heating portion with the heater layer 80a in the thickness of 120 nm and the heating portion with the heater layer 80a in the thickness of 110 nm. In this case, the sheet resistance variation is 8.9%.

In contrast to it, Example 13 is a case where the same heater layer 80a as in Comparative Example 3 is formed in the thickness of 120 nm and, in addition thereto, the cap layer 80b is formed of AuCu of Cu 5 at % (electrical resistivity 7.5 μΩ·cm) and where the step of removing the electrode film 120 results in the variation of 10 nm in the thickness of the heater layer 80a removed together with the electrode film 120, so as to obtain the heating portion with the cap layer 80b in the thickness of 20 nm and the heating portion with the cap layer 80b in the thickness of 10 nm. Examples 14 to 18 are cases similar to Example 13 except that the material of the cap layer 80b is AuCu of Cu 10 at % (electrical resistivity 10 μΩ·cm), AuCu of Cu 20 at % (electrical resistivity 14 μΩ·cm, equivalent to four times the electrical resistivity of the heater layer), AuNi of Ni 15 at % (electrical resistivity 20 μΩ·cm), Ti (electrical resistivity 180 μΩ·cm), or Ta (electrical resistivity 180 μΩ·cm), respectively. The sheet resistance variations of the heater in Examples 13 to 18 were 4.5, 2.5, 1.8, 1.4, 0.2, and 0.2% in order. The results of these are presented in FIG. 14.

Next, Comparative Example 4 is a case where the heater layer 80a of the heating portion 81 is made of Mo (electrical resistivity 16 μΩ·cm), without the cap layer 80b, and where the step of removing the electrode film 120 results in the variation of 10 nm in the thickness of the heater layer 80a removed together with the electrode film 120, so as to obtain the heating portion with the heater layer 80a 150 nm thick and the heating portion with the heater layer 80a 140 nm thick. In this case, the sheet resistance variation is 7.1%.

In contrast to it, Example 19 is a case where the same heater layer 80a as in Comparative Example 4 is formed in the thickness of 150 nm and, in addition thereto, the cap layer 80b is made of NiFeNb (electrical resistivity 32 μΩ·cm) resulting from addition of Nb 2 wt % to NiFe of Ni 80 wt % and Fe 20 wt % and where the step of removing the electrode film 120 results in the variation of 10 nm in the thickness of the cap layer 80b removed together with the electrode film 120, so as to obtain the heating portion with the cap layer 80b in the thickness of 20 nm and the heating portion with the cap layer 80b in the thickness of 10 nm. Examples 20 to 24 are cases similar to Example 19 except that the material of the cap layer 80b is NiFeNb (electrical resistivity 45 μΩ·cm) resulting from addition of Nb 5 wt % to NiFe of Ni 80 wt % and Fe 20 wt %, NiFeNb (electrical resistivity 60 μΩ·cm, equivalent to 3.8 times the electrical resistivity of the heater layer) resulting from addition of Nb 7 wt % to NiFe of Ni 80 wt % and Fe 20 wt %, NiFeNb (electrical resistivity 80 μΩ·cm, equivalent to 5.0 times the electrical resistivity of the heater layer) resulting from addition of Nb 12 wt % to NiFe of Ni 80 wt % and Fe 20 wt %, Ti (electrical resistivity 180 μΩ·cm), or Ta (electrical resistivity 180 μΩ·cm), respectively. The sheet resistance variations of the heater in Examples 19–24 were 3.2, 2.4, 1.5, 1.3, 0.6, and 0.6% in order. The results of these are presented in FIG. 15.

Next, Comparative Example 5 is a case where the heater layer 80a of the heating portion 81 is made of Rh (electrical resistivity 17.5 μΩ·cm), without the cap layer 80b, and where the step of removing the electrode film 120 results in the variation of 10 nm in the thickness of the heater layer 80a removed together with the electrode film 120, so as to obtain the heating portion with the heater layer 80a in the thickness of 150 nm and the heating portion with the heater layer 80a in the thickness of 140 nm. In this case, the sheet resistance variation is 7.1%.

In contrast to it, Example 25 is a case where the same heater layer 80a as in Comparative Example 5 is formed in the thickness of 150 nm and, in addition thereto, the cap layer 80b is made of NiFeNb (electrical resistivity 32 μΩ·cm) resulting from addition of Nb 2 wt % to NiFe of Ni 80 wt % and Fe 20 wt % and where the step of removing the electrode film 120 results in the variation of 10 nm in the thickness of the cap layer 80b removed together with the electrode film 120, so as to obtain the heating portion with the cap layer 80b in the thickness of 20 nm and the heating portion with the cap layer 80b in the thickness of 10 nm. Examples 26 to 30 are cases similar to Example 25 except that the material of the cap layer 80b is NiFeNb (electrical resistivity 45 μΩ·cm) resulting from addition of Nb 5 wt % to NiFe of Ni 80 wt % and Fe 20 wt %, NiFeNb (electrical resistivity 70 μΩ·cm, equivalent to four times the electrical resistivity of the heater layer) resulting from addition of Nb 10 wt % to NiFe of Ni 80 wt % and Fe 20 wt %, NiFeNb (electrical resistivity 95 μΩ·cm) resulting from addition of Nb 15 wt % to NiFe of Ni 80 wt % and Fe 20 wt %, Ti (electrical resistivity 180 μΩ·cm), or Ta (electrical resistivity 180 μΩ·cm), respectively. The sheet resistance variations of the heater in Examples 25 to 30 were 3.6, 2.5, 1.7, 1.2, 0.6, and 0.6% in order. The results of these are presented in FIG. 16.

Next, Comparative Example 6 is a case where the heater layer 80a of the heating portion 81 is made of CoFe of Co 90 wt % and Fe 10 wt % (electrical resistivity 20 μΩ·cm), without the cap layer 80b, and where the step of removing the electrode film 120 results in the variation of 10 nm in the thickness of the heater layer 80a removed together with the electrode film 120, so as to obtain the heating portion with the heater layer 80a in the thickness of 130 nm and the heating portion with the heater layer 80a in the thickness of 120 nm. In this case, the sheet resistance variation is 8.4%.

In contrast to it, Example 31 is a case where the same heater layer 80a as in Comparative Example 6 is formed in the thickness of 130 nm and, in addition thereto, the cap layer 80b is made of NiFeNb (electrical resistivity 45 μΩ·cm) resulting from addition of Nb 5 wt % to NiFe of Ni 80 wt % and Fe 20 wt % and where the step of removing the electrode film 120 results in the variation of 10 nm in the thickness of the cap layer 80b removed together with the electrode film 120, so as to obtain the heating portion with the cap layer 80b in the thickness of 20 nm and the heating portion with the cap layer 80b in the thickness of 10 nm. Examples 32 to 36 are cases similar to Example 31 except that the material of the cap layer 80b is NiFeNb (electrical resistivity 70 μΩ·cm) resulting from addition of Nb 10 wt % to NiFe of Ni 80 wt % and Fe 20 wt %, NiFeNb (electrical resistivity 80 μΩ·cm, equivalent to 4.0 times the electrical resistivity of the heater layer) resulting from addition of Nb 12 wt % to NiFe of Ni 80 wt % and Fe 20 wt %, NiFeNb (electrical resistivity 95 μΩ·cm) resulting from addition of Nb 15 wt % to NiFe of Ni 80 wt % and Fe 20 wt %, Ti (electrical resistivity 180 μΩ·cm), or Ta (electrical resistivity 180 μΩ·cm), respectively. The sheet resistance variations of the heater in Examples 31–36 were 3.3, 2.1, 1.9, 1.6, 0.8, and 0.8% in order. The results of these are presented in FIG. 17.

As apparent from the above data, it was clearly shown that the variation in the heating portion 81 of the heater member 80 was reduced by the provision of the cap layer 80b with the electrical resistivity higher than that of the heater layer 80a, on the heater layer 80a. It was also verified that the variation decreased as the electrical resistivity of the cap layer 80b increased relative to that of the heater layer 80a and that, particularly, where the electrical resistivity of the cap layer 80b was four or more times that of the heater layer, the variation was controlled at or below 2.0%.

The invention accomplished by the Inventors was specifically described on the basis of the embodiments thereof, but it is noted that the present invention is by no means intended to be limited to the above embodiments.

For example, the above embodiment showed the electrode film members 87a, 87b laid on the extraction electrodes 85a, 85b of the heater member 80, but they may be electrically connected to the extraction electrodes 85a, 85b, for example, through an electrically conductive layer of a material equivalent to the cap layer 80b.

The location of the heater member 80 does not have to be limited to that in the above embodiment, but the heater member 80 can be located at any position, for example, in the undercoat layer 113, in the insulating layer 72, and so on. The magnetic head may have two or more heater members 80. There are no restrictions on the distance from the ABS S side of the heater member 80. Furthermore, there are no particular restrictions on the shape of the current-carrying path of the heater member 80, either.

The cap layer 80b of the heating portion 81 in the heater member 80 may be made of any material that has the electrical resistivity higher than that of the heater layer 80a; for example, it can be made of an insulator such as alumina or the like.

The heater member 80 may be covered by a shield layer containing a soft magnetic material, depending upon the amount of the current flowing through the heater member 80 or the like, whereby it can prevent a leaking magnetic field from the heater member 80, if any, from adversely affecting the recording head part 60 and the reading head part 30.

Furthermore, in the reading head part 30 the GMR device 40 may be replaced by any other MR device, such as an AMR (Anisotropy Magneto Resistive) device making use of the anisotropic magnetoresistance effect, a TMR (Tunnel-type Magneto Resistive) device making use of the magnetoresistance effect occurring in a tunnel junction, or a CPP (Current Perpendicular to Plane)-GMR device. The thin-film magnetic head may be one of the perpendicular recording system, instead of the longitudinal recording system.

FIG. 2 shows the configuration wherein the thin-film magnetic head 10 incorporating the recording head part 60 and the GMR device 40 is located at one end part in the track width direction perpendicular to the track lines, in the distal end region of the slider 11, but it may be located at the other end part or in the central region in the track width direction. The point is that the thin-film magnetic head 10 is located at the position facing the ABS S on the slider 11.

FIG. 2 shows the configuration wherein the heater pads 86a, 86b are placed between the recording pads 18a, 18b and the reading pads 19a, 19b, but they can be located in any arrangement, without having to be limited to it.

According to the present invention, as described above, the thin-film magnetic head is provided with the heater consisting of the heater layer with the low electrical resistivity and the cap layer with the electrical resistivity higher than that of the heater layer and adapted to generate heat when energized; therefore, the heater generates heat to thermally expand the thin-film magnetic head, thereby decreasing the distance between the recording medium and the magnetoresistive device/electromagnetic conversion device. Since the heater has the heater layer and the cap layer, part of the cap layer with the higher electrical resistivity in the heater is removed together with the electrode film during the removal of the electrode film, and this decreases the variation in the sheet resistance of the entire heater.

The basic Japanese Application No. 2003-67228 filed on Mar. 12, 2003 is hereby incorporated by reference.

What is claimed is:

1. A thin-film magnetic head comprising:
    a heater layer with a predetermined electrical resistivity forming a current-carrying path of a predetermined shape;
    an electrically conductive electrode film member located so as to face a first portion of one principal surface of the heater layer and electrically connected to the heater layer;
    a cap layer with an electrical resistivity higher than that of the heater layer, provided in correspondence to the shape of the current-carrying path on a second portion, that is different from the first portion, of said one principal surface of the heater layer; and
    an electrically conductive bump formed on the electrode film member by plating.

2. The thin-film magnetic head according to claim 1, wherein the electrode film member is laid on said first portion of the heater layer.

3. The thin-film magnetic head according to claim 1, wherein the electrical resistivity of the cap layer is four or more times the electrical resistivity of the heater layer.

4. The thin-film magnetic head according to claim 1, wherein the heater layer contains one material selected from Cu, Au, Ni, Co, Ta, W, Mo, Rh, and alloys of these.

5. The thin-film magnetic head according to claim 1, wherein the cap layer contains one material selected from Ta, Ti, Pt, Ru, Rh, Hf, Cr, Ni, Co, W, Mo, Rh, and alloys of these.

6. A head gimbal assembly comprising a base, a thin-film magnetic head formed on the base, and a gimbal adapted to fix the base, wherein the thin-film magnetic head comprises a heater layer with a predetermined electrical resistivity forming a current-carrying path of a predetermined shape; an electrically conductive electrode film member located so as to face a first portion of one principal surface of the heater layer and electrically connected to the heater layer; a cap layer with an electrical resistivity higher than that of the heater layer, provided in correspondence to the shape of the current-carrying path on a second portion, that is different from the first portion, of said one principal surface of the heater layer; and an electrically conductive bump formed on the electrode film member by plating.

7. A hard disk drive comprising a base, a thin-film magnetic head formed on the base, and a recording medium opposed to the thin-film magnetic head, wherein the thin-film magnetic head comprises a heater layer with a predetermined electrical resistivity forming a current-carrying path of a predetermined shape; an electrically conductive electrode film member located so as to face a first portion of one principal surface of the heater layer and electrically connected to the heater layer; a cap layer with an electrical resistivity higher than that of the heater layer, provided in correspondence to the shape of the current-carrying path on a second portion, that is different from the first portion, of said one principal surface of the heater layer; and an electrically conductive bump formed on the electrode film member by plating.

* * * * *